US012617399B2

(12) United States Patent
Kamatani

(10) Patent No.: US 12,617,399 B2
(45) Date of Patent: May 5, 2026

(54) VEHICLE DRIVING ASSISTANCE APPARATUS, VEHICLE DRIVING ASSISTANCE METHOD, AND COMPUTER-READABLE STORAGE MEDIUM STORING VEHICLE DRIVING ASSISTANCE PROGRAM

(71) Applicants: TOYOTA JIDOSHA KABUSHIKI KAISHA, Toyota (JP); DENSO CORPORATION, Kariya-city (JP)

(72) Inventor: Hideki Kamatani, Nagoya (JP)

(73) Assignees: TOYOTA JIDOSHA KABUSHIKI KAISHA, Toyota (JP); DENSO CORPORATION, Kariya-City (JP)

( * ) Notice: Subject to any disclaimer, the term of this patent is extended or adjusted under 35 U.S.C. 154(b) by 187 days.

(21) Appl. No.: 18/531,179

(22) Filed: Dec. 6, 2023

(65) Prior Publication Data

US 2024/0190430 A1 Jun. 13, 2024

(30) Foreign Application Priority Data

Dec. 8, 2022 (JP) ................................. 2022-196567

(51) Int. Cl.
*B60W 30/16* (2020.01)
*B60W 30/14* (2006.01)
*B60W 30/18* (2012.01)

(52) U.S. Cl.
CPC .......... *B60W 30/16* (2013.01); *B60W 30/143* (2013.01); *B60W 30/18072* (2013.01); *B60W 2520/10* (2013.01); *B60W 2552/15* (2020.02); *B60W 2720/106* (2013.01)

(58) Field of Classification Search
CPC .............. B60W 30/16; B60W 30/143; B60W 30/18072
See application file for complete search history.

(56) References Cited

U.S. PATENT DOCUMENTS 8,355,851 B2 1/2013 Inoue et al.
8,370,040 B2 2/2013 Inoue et al.
8,417,430 B2 4/2013 Saeki
(Continued)

FOREIGN PATENT DOCUMENTS

JP 2018-134925 A 8/2018

*Primary Examiner* — Imran K Mustafa
(74) *Attorney, Agent, or Firm* — Sughrue Mion, PLLC

(57) ABSTRACT

A vehicle driving assistance apparatus executes an autonomous acceleration/deceleration control to maintain an own vehicle moving speed within a predetermined speed range, or maintain an inter-vehicle distance within a predetermined distance range, executes a coasting control when the deceleration of the own vehicle is requested in a situation where the autonomous acceleration/deceleration control is being executed, and executes a power running control when the acceleration of the own vehicle is requested in the situation where the autonomous acceleration/deceleration control is being executed. The vehicle driving assistance apparatus terminates executing the autonomous acceleration/deceleration control when a predetermined condition relating to at least one of a gradient of a road on which the own vehicle is moving and the moving speed of the own vehicle in the situation where the autonomous acceleration/deceleration control is being executed.

14 Claims, 7 Drawing Sheets

(56)                    References Cited

U.S. PATENT DOCUMENTS

|  8,548,709 | B2  | 10/2013 | Morita |
|  8,768,597 | B2  | 7/2014  | Kagawa |
|  9,174,643 | B2  | 11/2015 | Aso |
| 10,017,178 | B2  | 7/2018  | Morimoto et al. |
| 10,118,617 | B2  | 11/2018 | Urano et al. |
| 10,486,698 | B2  | 11/2019 | Masui et al. |
| 2019/0100204 | A1* | 4/2019 | Plianos ........... B60W 30/18127 |
| 2019/0295419 | A1  | 9/2019 | Tosa et al. |
| 2024/0270256 | A1* | 8/2024 | Ozawa .................. B60K 31/00 |

* cited by examiner

VEHICLE DRIVING ASSISTANCE APPARATUS, VEHICLE DRIVING ASSISTANCE METHOD, AND COMPUTER-READABLE STORAGE MEDIUM STORING VEHICLE DRIVING ASSISTANCE PROGRAM

CROSS-REFERENCE TO RELATED APPLICATIONS

This application claims priority to Japanese patent application No. JP 2022-196567 filed on Dec. 8, 2022, the content of which is hereby incorporated by reference in its entirety.

BACKGROUND

Field

The present invention relates to a vehicle driving assistance apparatus, a vehicle driving assistance method, and a computer-readable storage medium storing a vehicle driving assistance program.

Description of the Related Art

There is known a vehicle driving assistance apparatus which executes an autonomous acceleration/deceleration control of controlling a moving speed of the own vehicle by autonomously accelerating or decelerating the own vehicle based on a set speed, or controlling a distance between the own vehicle and a preceding vehicle by autonomously accelerating or decelerating the own vehicle based on a target inter-vehicle distance. Further, there is also known a vehicle driving assistance apparatus which causes the own vehicle to coast when a deceleration of the own vehicle is requested in a situation where the vehicle driving assistance apparatus is executing the autonomous acceleration/deceleration control in order to improve an energy efficiency of moving the own vehicle (for example, refer to JP 2018-134925 A).

When the deceleration of the own vehicle is requested in the situation where the own vehicle is moved by the autonomous acceleration/deceleration control which uses a coasting, the coasting control is executed, and the own vehicle coasts. Therefore, when the own vehicle is moving on an even road in the situation where the own vehicle is moved by the autonomous acceleration/deceleration control, a movement energy efficiency (i.e., the energy efficiency of moving the own vehicle) is improved.

In this regard, for example, when the own vehicle is moving on an upward slope, a deceleration rate of the own vehicle caused to coast is great. As a result, a type of running the own vehicle is frequently switched between a power running of the own vehicle and a coasting of the own vehicle. In this case, the movement energy efficiency in executing the autonomous acceleration/deceleration control may decrease. Therefore, in such a situation, the autonomous acceleration/deceleration control should not continue being executed.

On the other hand, when the own vehicle is moving on a downward slope, the own vehicle caused to coast is not decelerated, and may be accelerated. In this case, the moving speed of the own vehicle may increase excessively. As a result, even when the autonomous acceleration/deceleration control is executed, the moving speed of the own vehicle cannot be maintained within the predetermined speed range, or the distance between the own vehicle and the other vehicle cannot be maintained within the predetermined distance range. Therefore, in such a situation, the autonomous acceleration/deceleration control should not continue being executed.

Further, when the moving speed of the own vehicle is relatively great, a movement resistance of the own vehicle is great. Therefore, in such a situation, when the autonomous acceleration/deceleration control using the coasting is executed, the movement energy efficiency of moving the own vehicle may decrease.

SUMMARY

An object of the present invention is to provide a vehicle driving assistance apparatus, a vehicle driving assistance method, and a computer-readable storage medium storing a vehicle driving assistance program which can prevent the autonomous acceleration/deceleration control from continuing being executed in a situation where the autonomous acceleration/deceleration control should not be executed.

According to the present invention, a vehicle driving assistance apparatus, comprising an electronic control unit. The electronic control unit is configured to execute an autonomous acceleration/deceleration control of autonomously controlling an acceleration and a deceleration of an own vehicle so as to maintain a moving speed of the own vehicle within a predetermined speed range, or maintain a distance between the own vehicle and another vehicle existing around the own vehicle within a predetermined distance range, execute a coasting control of causing the own vehicle to coast when the deceleration of the own vehicle is requested in a situation where the electronic control unit is executing the autonomous acceleration/deceleration control, and execute a power running control of running the own vehicle with power when the acceleration of the own vehicle is requested in the situation where the electronic control unit is executing the autonomous acceleration/deceleration control. Further, the electronic control unit is configured to terminate executing the autonomous acceleration/deceleration control when a predetermined condition relating to at least one of (i) a gradient of a road on which the own vehicle is moving and (ii) the moving speed of the own vehicle in the situation where the electronic control unit is executing the autonomous acceleration/deceleration control.

The movement energy efficiency of moving the own vehicle varies depending on the gradient of the road on which the own vehicle is moving and the moving speed of the own vehicle in a situation where the autonomous acceleration/deceleration control is being executed. That is, the movement energy efficiency of moving the own vehicle may decrease when the autonomous acceleration/deceleration control is executed in a situation where the gradient of the road on which the own vehicle is moving corresponds to a certain gradient, or the moving speed of the own vehicle corresponds to a certain speed.

With the vehicle driving assistance apparatus according to the present invention, an execution of the autonomous acceleration/deceleration control is terminated when the predetermined condition relating to at least one of the gradient of the road on which the own vehicle is moving and the moving speed of the own vehicle, becomes satisfied in the situation where the autonomous acceleration/deceleration control is being executed. Thus, the autonomous acceleration/deceleration control can be prevented from continuing being executed in the situation where the autonomous acceleration/deceleration control should not be executed.

Further, in the vehicle driving assistance apparatus according to an aspect of the present invention, the predetermined condition may include one of a first condition and a second condition. In this aspect, the first condition may correspond to one of a condition which is more likely to become satisfied when the moving speed of the own vehicle is equal to or greater than a predetermined first speed than when the moving speed of the own vehicle is smaller than the predetermined first speed, and a condition which is more likely to become satisfied when the gradient of the road on which the own vehicle is moving is equal to or greater than a predetermined first gradient than when the gradient of the road on which the own vehicle is moving is smaller than the predetermined first gradient. Further, in this aspect, the second condition may correspond to a condition which is more likely to become satisfied when the gradient of the road on which the own vehicle is moving is equal to or smaller than a predetermined second gradient than when the gradient of the road on which the own vehicle is moving is greater than the predetermined second gradient.

When the moving speed of the own vehicle is great in the situation where the autonomous acceleration/deceleration control is being executed, the movement energy efficiency of moving the own vehicle may decrease. Further, when the gradient of the road on which the own vehicle is moving is great in the situation where the autonomous acceleration/deceleration control is being executed, the movement energy efficiency of moving the own vehicle may decrease. Furthermore, when the gradient of the road on which the own vehicle is moving is small in the situation where the autonomous acceleration/deceleration control is being executed, the movement energy efficiency of moving the own vehicle may decrease.

With the vehicle driving assistance apparatus according to this aspect of the present invention, in a situation where the predetermined condition includes the first condition which is more likely to become satisfied when the moving speed of the own vehicle is moving is equal to or greater than the predetermined first speed than when the moving speed of the own vehicle is smaller than the predetermined first speed, the execution of the autonomous acceleration/deceleration control is terminated when the moving speed of the own vehicle is great. Further, with the vehicle driving assistance apparatus according to this aspect of the present invention, in a situation where the predetermined condition includes the first condition which is more likely to become satisfied when the gradient of the road on which the own vehicle is moving is equal to or greater than the predetermined first gradient than when the gradient of the road on which the own vehicle is moving is smaller than the predetermined first gradient, the execution of the autonomous acceleration/deceleration control is terminated when the gradient of the road on which the own vehicle is moving great. Furthermore, with the vehicle driving assistance apparatus according to this aspect of the present invention, in a situation where the predetermined condition includes the second condition which is more likely to become satisfied when the gradient of the road on which the own vehicle is moving is equal to or smaller than the predetermined second gradient than when the gradient of the road on which the own vehicle is moving is greater than the predetermined second gradient, the execution of the autonomous acceleration/deceleration control is terminated when the gradient of the road on which the own vehicle is moving small. Thus, the autonomous acceleration/deceleration control can be prevented from continuing being executed in the situation where the autonomous acceleration/deceleration control should not be executed.

Furthermore, in the vehicle driving assistance apparatus according to another aspect of the present invention, the predetermined condition may include one of a first condition and a second condition. In this aspect, the first condition may correspond to one of a high speed condition that the moving speed of the own vehicle is greater than a predetermined vehicle speed threshold, and an upward slope gradient condition that the gradient of the road on which the own vehicle is moving corresponds to an upward slope gradient which is greater than a predetermined upward slope gradient threshold. Further, in this aspect, the second condition may correspond to a downward slope gradient condition that the gradient of the road on which the own vehicle is moving corresponds to a downward slope gradient which is greater than a predetermined downward slope gradient threshold.

With the vehicle driving assistance apparatus according to this aspect of the present invention, the execution of the autonomous acceleration/deceleration control is terminated when the moving speed of the own vehicle is great, or when the gradient of the road on which the own vehicle is moving is great, or when the gradient of the road on which the own vehicle is moving is small. Thus, the autonomous acceleration/deceleration control can be prevented from continuing being executed in the situation where the autonomous acceleration/deceleration control should not be executed.

Furthermore, in the vehicle driving assistance apparatus according to further another aspect of the present invention, the electronic control unit may be configured to start to execute a moving speed control of autonomously accelerating or decelerating the own vehicle to maintain the moving speed of the own vehicle at a predetermined moving speed when the first condition becomes satisfied, and the electronic control unit terminates executing the autonomous acceleration/deceleration control.

As described above, in the situation where the own vehicle is moving on the upward slope, the deceleration rate of the coasting own vehicle is great. As a result, a type of running the own vehicle is frequently switched between a power running of the own vehicle and a coasting of the own vehicle. In this case, the movement energy efficiency in executing the autonomous acceleration/deceleration control may decrease. Further, in a situation where the moving speed of the own vehicle is great, the movement energy efficiency in executing the autonomous acceleration/deceleration control may decrease.

With the vehicle driving assistance apparatus according to this aspect of the present invention, when the first condition becomes satisfied, the execution of the autonomous acceleration/deceleration control is terminated, and the moving speed control starts to be executed. Thus, a control of autonomously controlling the acceleration or the deceleration of the own vehicle can continue to be executed while the movement energy efficiency is prevented from decreasing.

Furthermore, in the vehicle driving assistance apparatus according to further another aspect of the present invention, the electronic control unit may be configured to execute a moving speed control of autonomously accelerating or decelerating the own vehicle to maintain the moving speed of the own vehicle at a predetermined moving speed when the second condition becomes satisfied, and the electronic control unit terminates executing the autonomous acceleration/deceleration control in a situation where the moving speed of the own vehicle is equal to or greater than a predetermined moving speed.

As described above, when the own vehicle is moving on the downward slope, the coasting own vehicle is not decelerated, and may be accelerated. In this case, the moving speed of the own vehicle may increase excessively.

With the vehicle driving assistance apparatus according to this aspect of the present invention, the moving speed control is executed when the second condition becomes satisfied, and the execution of the autonomous acceleration/deceleration control is terminated in the situation where the moving speed of the own vehicle is equal to or greater than the predetermined moving speed. Thus, the moving speed of the own vehicle can be prevented from increasing excessively.

Furthermore, in the vehicle driving assistance apparatus according to further another aspect of the present invention, the electronic control unit may be configured to execute the coasting control when the second condition becomes satisfied, and the electronic control unit terminates executing the autonomous acceleration/deceleration control in a situation where the moving speed of the own vehicle is smaller than the predetermined moving speed.

In a situation where the own vehicle is moving on the downward slope, and the moving speed of the own vehicle is smaller than the predetermined moving speed, the own vehicle should be moved at the great movement energy efficiency by causing the own vehicle to coast until the moving speed of the own vehicle reaches the predetermined moving speed.

With the vehicle driving assistance apparatus according to this aspect of the present invention, the coasting control is executed when the second condition becomes satisfied, and the execution of the autonomous acceleration/deceleration control is terminated in the situation where the moving speed of the own vehicle is smaller than the predetermined moving speed. Thus, the movement energy efficiency can be improved.

Furthermore, in the vehicle driving assistance apparatus according to further another aspect of the present invention, the power running control may correspond to an optimum power running control of (i) activating a driving apparatus at an activation state where an energy efficiency of moving the own vehicle is equal to or greater than a predetermined energy efficiency and (ii) moving the own vehicle by a driving force output from the driving apparatus. Further, in this aspect, the predetermined upward slope gradient threshold may be set to one of a gradient at which an absolute value of a deceleration rate of the own vehicle is equal to or greater than a predetermined deceleration rate threshold in a situation where the gradient of the road on which the own vehicle is moving corresponds to the upward slope gradient, and the own vehicle is moved by the coasting control, and a gradient at which an acceleration rate of the own vehicle is equal to or smaller than a predetermined acceleration rate threshold in a situation where the gradient of the road on which the own vehicle is moving corresponds to the upward slope gradient, and the own vehicle is moved by the optimum power running control.

The vehicle driving assistance apparatus according to this aspect of the present invention determines whether the first condition is satisfied based on the deceleration rate or the acceleration rate of the own vehicle when the vehicle driving assistance apparatus executes the coasting control or the optimum power running control in the situation where the gradient of the road on which the own vehicle is moving corresponds to the upward slope gradient. Thus, the vehicle driving assistance apparatus can accurately determine whether the movement energy efficient is increased or decreased due to the execution of the autonomous acceleration/deceleration control.

Furthermore, in the vehicle driving assistance apparatus according to further another aspect of the present invention, the power running control may correspond to an optimum power running control of (i) activating a driving apparatus at an activation state where an energy efficiency of moving the own vehicle is equal to or greater than a predetermined energy efficiency and (ii) moving the own vehicle by a driving force output from the driving apparatus. Further, in this aspect, the predetermined upward slope threshold may be set to a gradient at which a rate of an absolute value of an upward-slope-gradient coasting deceleration rate of the own vehicle to an upward-slope-gradient optimum acceleration rate of the own vehicle is greater than a predetermined rate.

Further, in this aspect, the upward-slope-gradient optimum acceleration rate may correspond to an acceleration rate of the own vehicle realized by moving the own vehicle by the optimum power running control in the situation where the gradient of the road on which the own vehicle is moving corresponds to the upward slope gradient. Further, in this aspect, the upward-slope-gradient coasting deceleration rate may correspond to a deceleration rate of the own vehicle realized by moving the own vehicle by the coasting control in the situation where the gradient of the road on which the own vehicle is moving corresponds to the upward slope gradient.

The vehicle driving assistance apparatus according to this aspect of the present invention determines whether the first condition is satisfied based on the rate of the absolute value of the upward-slope-gradient coasting deceleration rate of the own vehicle to the upward-slope-gradient optimum acceleration rate of the own vehicle. Thus, the vehicle driving assistance apparatus can accurately determine whether the movement energy efficient is increased or decreased due to the execution of the autonomous acceleration/deceleration control.

Furthermore a vehicle driving assistance method according to the invention comprises steps of executing an autonomous acceleration/deceleration control of autonomously controlling an acceleration and a deceleration of an own vehicle so as to maintain a moving speed of the own vehicle within a predetermined speed range, or maintain a distance between the own vehicle and another vehicle existing around the own vehicle within a predetermined distance range, executing a coasting control of causing the own vehicle to coast when the deceleration of the own vehicle is requested in a situation where the electronic control unit is executing the autonomous acceleration/deceleration control, and executing a power running control of running the own vehicle with power when the acceleration of the own vehicle is requested in the situation where the electronic control unit is executing the autonomous acceleration/deceleration control. Further, the vehicle driving assistance method comprises a step of terminating executing the autonomous acceleration/deceleration control when a predetermined condition relating to at least one of (i) a gradient of a road on which the own vehicle is moving and (ii) the moving speed of the own vehicle in the situation where the electronic control unit is executing the autonomous acceleration/deceleration control.

With the vehicle driving assistance method according to the present invention, for the reason described above, the autonomous acceleration/deceleration control can be prevented from continuing being executed in the situation where the autonomous acceleration/deceleration control should not be executed.

Furthermore, a computer-readable storage medium according to the present invention stores a vehicle driving assistance program. The vehicle driving assistance program is configured to execute an autonomous acceleration/deceleration control of autonomously controlling an acceleration and a deceleration of an own vehicle so as to maintain a moving speed of the own vehicle within a predetermined speed range, or maintain a distance between the own vehicle and another vehicle existing around the own vehicle within a predetermined distance range, execute a coasting control of causing the own vehicle to coast when the deceleration of the own vehicle is requested in a situation where the electronic control unit is executing the autonomous acceleration/deceleration control, and execute a power running control of running the own vehicle with power when the acceleration of the own vehicle is requested in the situation where the electronic control unit is executing the autonomous acceleration/deceleration control. Further, the vehicle driving assistance program is configured to terminate executing the autonomous acceleration/deceleration control when a predetermined condition relating to at least one of (i) a gradient of a road on which the own vehicle is moving and (ii) the moving speed of the own vehicle in the situation where the electronic control unit is executing the autonomous acceleration/deceleration control.

With the vehicle driving assistance program stored in the computer-readable storage medium according to the present invention, for the reason described above, the autonomous acceleration/deceleration control can be prevented from continuing being executed in the situation where the autonomous acceleration/deceleration control should not be executed.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
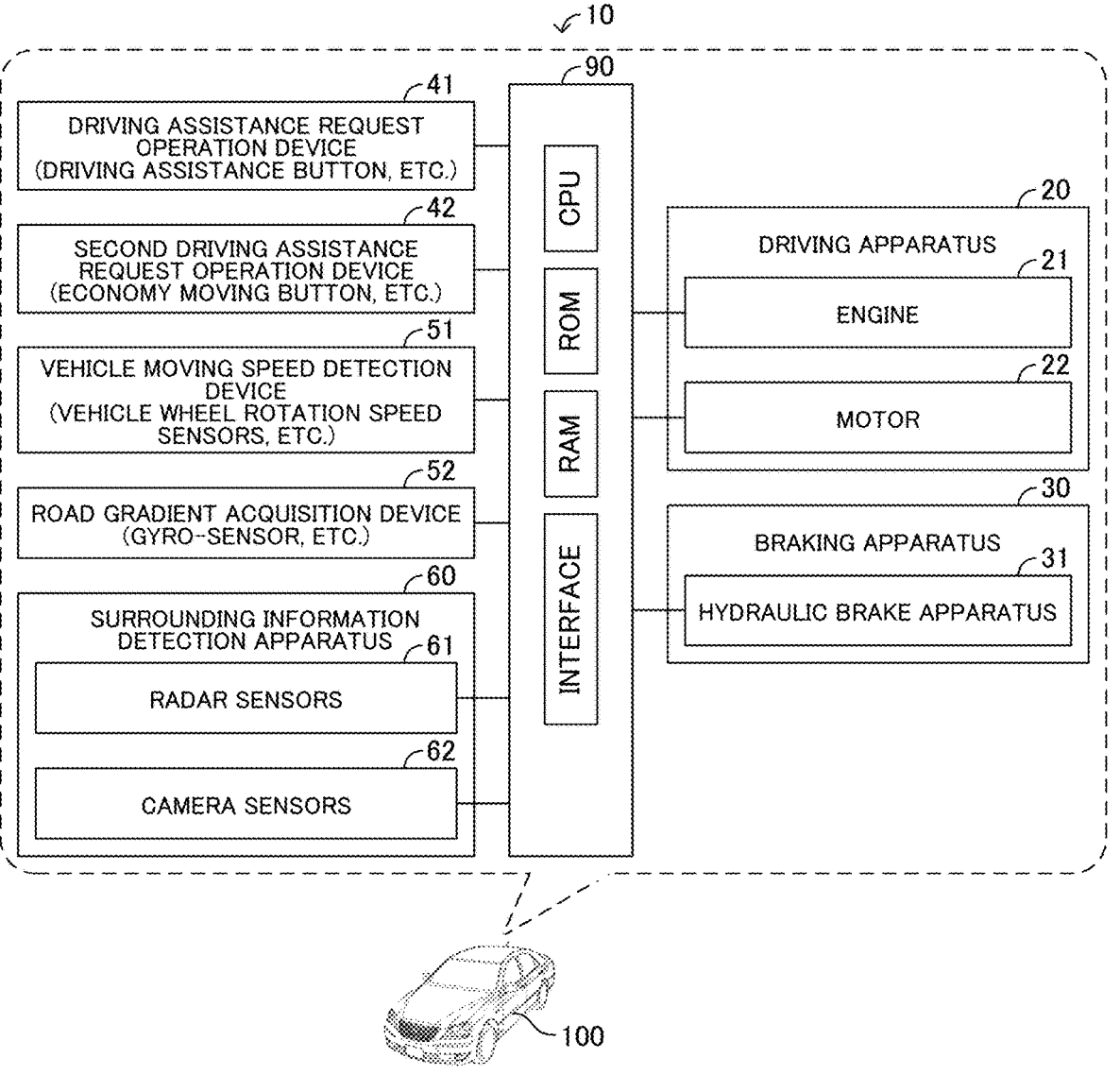
FIG. 1 is a view which shows a vehicle driving assistance apparatus according to an embodiment of the present invention.

Below, a vehicle driving assistance apparatus, a vehicle driving assistance method, and a computer-readable storage medium storing a vehicle driving assistance program according to an embodiment of the present invention, will be described with reference to the drawings. As shown in FIG. 1, the vehicle driving assistance apparatus 10 according to the embodiment of the present invention is installed on an own vehicle 100. Below, the vehicle driving assistance apparatus 10 will be described with an example that an operator of the own vehicle 100 is a driver of the own vehicle 100 (i.e., a person who is in the own vehicle 100 and directly drives the own vehicle 100).

In this regard, the operator of the own vehicle 100 may be a remote operator of the own vehicle 100 (i.e., a person who is not in the own vehicle 100 and remotely drives the own vehicle 100). When the operator of the own vehicle 100 is the remote operator, the vehicle driving assistance apparatus 10 is installed on the own vehicle 100 as well as a remote operation facility which is provided outside of the own vehicle 100 for remotely driving the own vehicle 100. In this case, functions realized by the own vehicle 100 described below are shared by the vehicle driving assistance apparatus 10 installed on the own vehicle 100 and the vehicle driving assistance apparatus 10 installed in the remote operation facility.

The vehicle driving assistance apparatus 10 includes an electronic control unit or an ECU 90. The ECU 90 includes a microcomputer as a main component. The microcomputer includes a CPU, a ROM, a RAM, a non-volatile memory, and an interface. The CPU is configured or programmed to realize various functions by executing instructions, or programs, or routines. In the present invention, the vehicle driving assistance apparatus 10 includes one ECU. In this regard, the vehicle driving assistance apparatus 10 may include plural ECUs. In this case, the ECUs share functions described below.

The vehicle driving assistance apparatus 10 executes an autonomous acceleration/deceleration control as an automatic driving control. The autonomous acceleration/deceleration control corresponds to a control of moving the own vehicle 100 by autonomously controlling a driving apparatus 20 and a braking apparatus 30 to accelerate or decelerate the own vehicle 100. In the present embodiment, the autonomous acceleration/deceleration control includes an inter-vehicle distance control and a moving speed control. Further, in the present embodiment, the driving apparatus 20 includes an internal combustion engine 21 and at least one electric motor 22. Furthermore, in the present embodiment, the braking apparatus 30 includes a hydraulic brake apparatus 31.

Figures 2A, 2B:
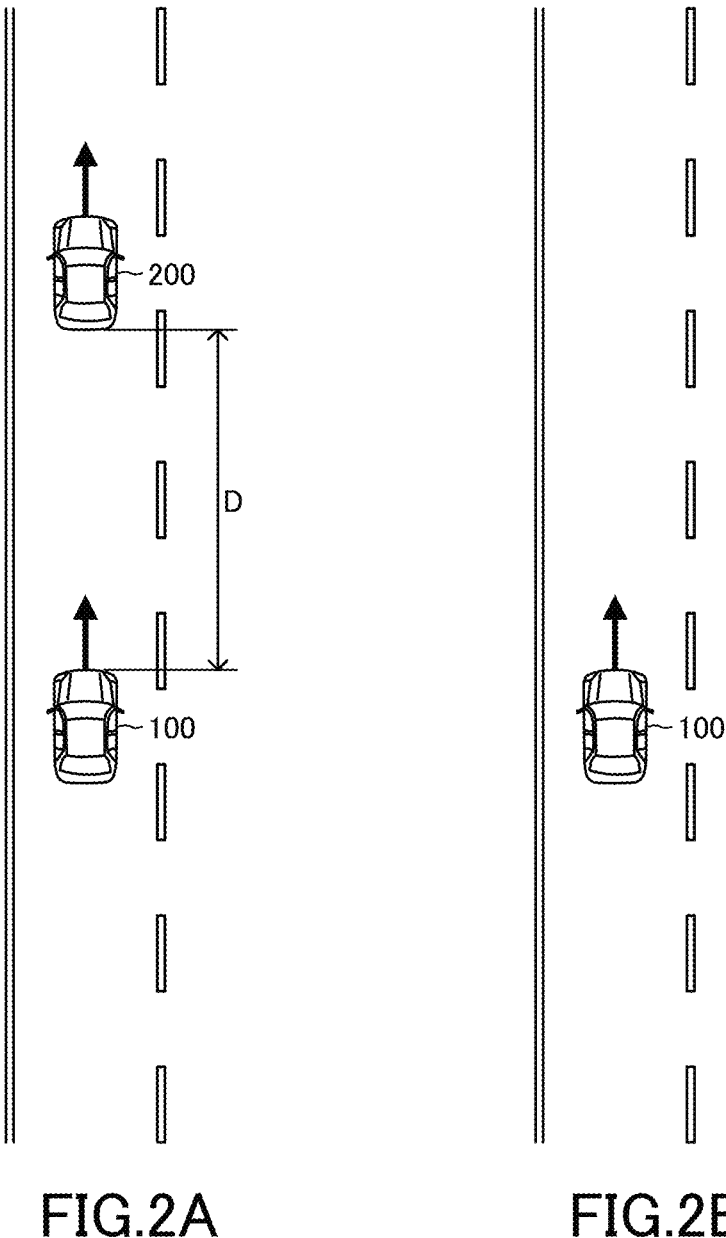
FIG. 2A is a view which shows a scene that there is a preceding vehicle ahead of an own vehicle.
FIG. 2B is a view which shows a scene that there is no preceding vehicle ahead of the own vehicle.

As shown in FIG. 2A, the inter-vehicle distance control corresponds to a control which is executed in a situation where a preceding vehicle 200 exists ahead of the own vehicle 100. The inter-vehicle distance control corresponds to a control of autonomously accelerating or decelerating the own vehicle 100 based on a target inter-vehicle distance Dtgt.

The preceding vehicle 200 is another vehicle which is moving ahead of the own vehicle 100 within a predetermined distance or a preceding vehicle determination distance Dth from the own vehicle 100. The vehicle driving assistance apparatus 10 detects the preceding vehicle 200 based on surrounding detection information IS.

As shown in FIG. 1, the own vehicle 100 is installed with a surrounding information detection apparatus 60. The surrounding detection information IS corresponds to information provided from the surrounding information detection apparatus 60. In the present embodiment, the surrounding information detection apparatus 60 includes radar sensors 61 and camera sensors 62. The radar sensors 61 and the camera sensors 62 are electrically connected to the ECU 90. The surrounding information detection apparatus 60 provides the ECU 90 with radar detection information (i.e., information on an area around the own vehicle 100 acquired by the radar sensors 61) as the surrounding detection information IS. Further, the surrounding information detection apparatus 60 provides the ECU 90 with image information (i.e., image data on the area around 100 acquired by the camera sensors 62) as the surrounding detection information IS. Therefore, the vehicle driving assistance apparatus 10 acquires the surrounding detection information IS from the surrounding information detection apparatus 60.

Further, the target inter-vehicle distance Dtgt corresponds to an inter-vehicle distance D which is set by the driver as a control target used for the inter-vehicle distance control. The inter-vehicle distance D corresponds to a distance between the own vehicle 100 and the preceding vehicle 200. The vehicle driving assistance apparatus 10 acquires the inter-vehicle distance D based on the surrounding detection information IS.

On the other hand, as shown in FIG. 2B, the moving speed control corresponds to a control which is executed in a situation where the preceding vehicle 200 does not exist ahead of the own vehicle 100. The moving speed control corresponds to the autonomous acceleration/deceleration control of autonomously accelerating or decelerating the own vehicle 100 based on a set speed Vset. The set speed Vset corresponds to an own vehicle moving speed Vego (i.e., a moving speed of the own vehicle 100) set by the driver as a control target used for the moving speed control.

As shown in FIG. 1, the own vehicle 100 is installed with a vehicle moving speed detection device 51. The vehicle moving speed detection device 51 is a device which detects the moving speed of the own vehicle 100. The vehicle moving speed detection device 51 includes, for example, vehicle wheel rotation speed sensors. The vehicle moving speed detection device 51 is electrically connected to the ECU 90. The vehicle driving assistance apparatus 10 acquires the moving speed of the own vehicle 100 as the own vehicle moving speed Vego by the vehicle moving speed detection device 51.

Next, operations of the vehicle driving assistance apparatus 10 will be described in detail. The vehicle driving assistance apparatus 10 is configured to execute a routine shown in FIG. 3 with a predetermined calculation cycle. The vehicle driving assistance apparatus 10 starts to execute the routine shown in FIG. 3 from a step S300 and proceeds with the process to a step S305 to determine whether a driving assistance execution condition C0 is satisfied. The driving assistance execution condition C0 corresponds to a condition that an execution of the autonomous acceleration/deceleration control is requested.

As shown in FIG. 1, the own vehicle 100 is installed with a driving assistance request operation device 41. The driving assistance request operation device 41 is a device which is operated by the driver of the own vehicle 100. The driving assistance request operation device 41 is, for example, a driving assistance button. The driving assistance request operation device 41 is electrically connected to the ECU 90. When the driving assistance request operation device 41 is operated in a situation where the vehicle driving assistance apparatus 10 determines that the execution of the autonomous acceleration/deceleration control is not requested, the vehicle driving assistance apparatus 10 determines that the execution of the autonomous acceleration/deceleration control is requested. On the other hand, when the driving assistance request operation device 41 is operated in a situation where the vehicle driving assistance apparatus 10 determines that the execution of the autonomous acceleration/deceleration control is requested, the vehicle driving assistance apparatus 10 determines that the execution of the autonomous acceleration/deceleration control is not requested. In this case, the vehicle driving assistance apparatus 10 determines that a termination of the execution of the autonomous acceleration/deceleration control is requested.

When the vehicle driving assistance apparatus 10 determines "Yes" at the step S305, the vehicle driving assistance apparatus 10 proceeds with the process to a step S310 to determine whether a first autonomous acceleration/deceleration condition C1 is satisfied. The first autonomous acceleration/deceleration condition C1 corresponds to a condition that an execution of a second autonomous acceleration/deceleration control or an economy moving control is not requested. In the present embodiment, the second autonomous acceleration/deceleration control includes a second inter-vehicle distance control and a second moving speed control described below, respectively.

As shown in FIG. 1, the own vehicle 100 is installed with a second driving assistance request operation device 42. The second driving assistance request operation device 42 is a device which is operated by the driver of the own vehicle 100. The second driving assistance request operation device 42 is, for example, an economy moving button. The second driving assistance request operation device 42 is electrically connected to the ECU 90. When the second driving assistance request operation device 42 is operated in a situation where the vehicle driving assistance apparatus 10 determines that the execution of the second autonomous acceleration/deceleration control is not requested, the vehicle driving assistance apparatus 10 determines that the execution of the second autonomous acceleration/deceleration control becomes requested. On the other hand, when the second driving assistance request operation device 42 is operated in a situation where the vehicle driving assistance apparatus 10 determines that the execution of the second autonomous acceleration/deceleration control is requested, the vehicle driving assistance apparatus 10 determines that the execution of the second autonomous acceleration/deceleration control becomes unrequested. In this case, the vehicle driving assistance apparatus 10 determines that a termination of the execution of the second autonomous acceleration/deceleration control is requested.

When the vehicle driving assistance apparatus 10 determines "Yes" at the step S310, the vehicle driving assistance apparatus 10 proceeds with the process to a step S315 to determine whether the preceding vehicle 200 exists.

When the vehicle driving assistance apparatus 10 determines "Yes" at the step S315, the vehicle driving assistance apparatus 10 proceeds with the process to a step S320 to execute a first inter-vehicle distance control.

The first inter-vehicle distance control corresponds to a control of maintaining the inter-vehicle distance D at the target inter-vehicle distance Dtgt. In particular, the first inter-vehicle distance control corresponds to a control of autonomously controlling the driving apparatus 20 and the braking apparatus 30 to accelerate or decelerate the own vehicle 100 to maintain the inter-vehicle distance D at the target inter-vehicle distance Dtgt. Therefore, the first inter-vehicle distance control is a so-called following moving control or an adaptive cruise control.

The target inter-vehicle distance Dtgt is set, for example, by the driver of the own vehicle 100.

Next, the vehicle driving assistance apparatus 10 proceeds with the process to a step S330 to set a value of a second autonomous acceleration/deceleration flag X to "0." Then, the vehicle driving assistance apparatus 10 proceeds with the process to a step S395 to terminate executing this routine once.

The value of the second autonomous acceleration/deceleration flag X is set to "1" when the second autonomous acceleration/deceleration control (the second inter-vehicle distance control or the second moving speed control) starts to be executed. On the other hand, when the execution of the second autonomous acceleration/deceleration control becomes unrequested, i.e. when the first autonomous acceleration/deceleration condition C1 becomes satisfied, the value of the second autonomous acceleration/deceleration flag X is set to "0."

On the other hand, when the vehicle driving assistance apparatus 10 determines "No" at the step S315, the vehicle driving assistance apparatus 10 proceeds with the process to a step S325 to execute a first moving speed control.

The first moving speed control corresponds to a control of maintaining the own vehicle moving speed Vego at the set speed Vset. In the present embodiment, the first moving speed control corresponds to the first autonomous acceleration/deceleration control. In particular, the first moving speed control corresponds to the autonomous acceleration/deceleration control of autonomously controlling the driving apparatus 20 and the braking apparatus 30 to accelerate or deceleration the own vehicle 100 to maintain the own vehicle moving speed Vego at the set speed Vset. Therefore, the first moving speed control is a so-called constant moving control or a cruise control.

The set speed Vset is set, for example, by the driver of the own vehicle 100.

Next, the vehicle driving assistance apparatus 10 proceeds with the process to a step S330 to set the value of the second autonomous acceleration/deceleration flag X to "0." Then, the vehicle driving assistance apparatus 10 proceeds with the process to the step S395 to terminate executing this routine once.

Further, when the vehicle driving assistance apparatus 10 determines "No" at the step S310, the vehicle driving assistance apparatus 10 proceeds with the process to a step S335 to determine whether a second autonomous decelerating condition Cth described below is satisfied.

Figure 4:
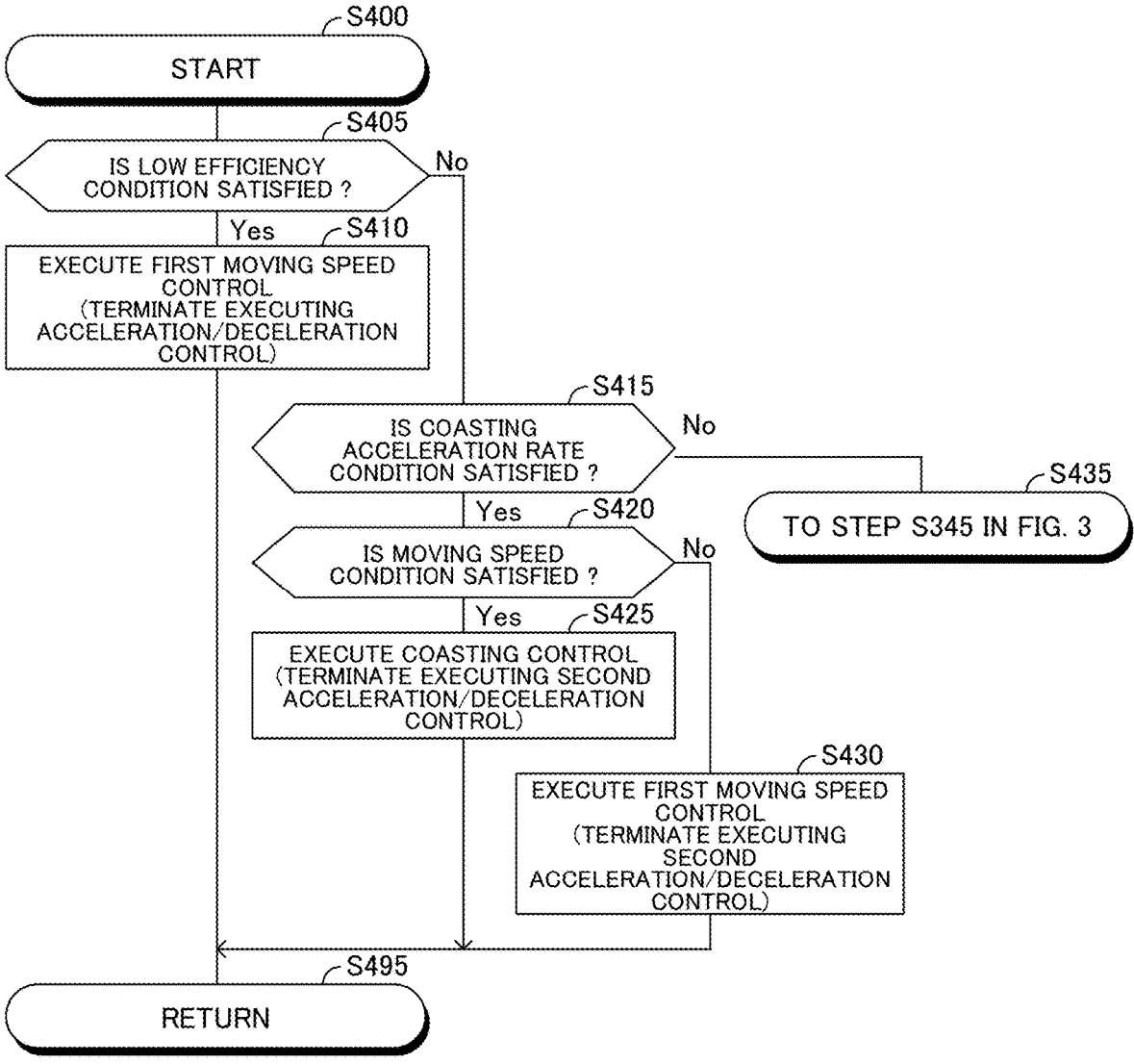
FIG. 4 is a view which shows a flowchart of a routine executed by the vehicle driving assistance apparatus according to the embodiment of the present invention.

When the vehicle driving assistance apparatus 10 determines "Yes" at the step S335, the vehicle driving assistance apparatus 10 proceeds with the process to a step S340 to execute a routine shown in FIG. 4. This routine will be described later in detail.

On the other hand, when the vehicle driving assistance apparatus 10 determines "No" at the step S335, the vehicle driving assistance apparatus 10 proceeds with the process to a step S345 to determine whether the preceding vehicle 200 exists. That is, when the first autonomous acceleration/ deceleration condition C1 is not satisfied at the step S310 and thus the second autonomous acceleration/deceleration condition C2 that the execution of the second autonomous acceleration/deceleration control or the economy moving control is requested, is satisfied, and the second autonomous decelerating condition Cth is not satisfied, the vehicle driving assistance apparatus 10 proceeds with the process to the step S345 to determine whether the preceding vehicle 200 exists.

When the vehicle driving assistance apparatus 10 determines "Yes" at the step S345, the vehicle driving assistance apparatus 10 proceeds with the process to a step S350 to execute a second inter-vehicle distance control.

The second inter-vehicle distance control corresponds to the autonomous acceleration/deceleration control of autonomously controlling an acceleration and a deceleration of the own vehicle 100 to maintain the inter-vehicle distance D within a predetermined distance range Rd by (i) starting to execute a coasting control when the inter-vehicle distance D (i.e., the distance between the own vehicle 100 and the preceding vehicle 200) decreases and reaches a lower limit value of a predetermined range (i.e., a lower limit distance Dlower of the predetermined distance range Rd) and (ii) starting to execute a steady power running control when the inter-vehicle distance D (i.e., the distance between the own vehicle 100 and the preceding vehicle 200) increases and reaches an upper limit value of the predetermine range (i.e., an upper limit distance Dupper of the predetermined distance range Rd).

In other words, the second inter-vehicle distance control corresponds to a control of maintaining the inter-vehicle distance D at a distance within the predetermined distance range Rd including the target inter-vehicle distance Dtgt by (i) executing the coasting control when the inter-vehicle distance D decreases and reaches the lower limit value or the lower limit distance Dlower of the predetermined distance range Rd and (ii) executing the steady power running control when the inter-vehicle distance D increases and reaches the upper limit value or the upper limit distance Dupper of the predetermined distance range Rd.

The coasting control corresponds to a control of causing the own vehicle 100 to coast or inertially move by rendering the driving force applied to the own vehicle 100 from the driving apparatus 20 zero. In the present embodiment, the coasting control corresponds to a control of causing the own vehicle 100 to coast or inertially move by stopping activations of the internal combustion engine 21 of the driving apparatus 20 and rendering the driving force applied to the own vehicle 100 from the driving apparatus 20 zero.

Further, the steady power running control corresponds to a control of (i) activating the driving apparatus 20 at a predetermined activation state and (ii) moving the own vehicle 100 with power by applying the driving force greater than zero to the own vehicle 100 from the driving apparatus 20. In particular, in the present embodiment, the steady power running control corresponds to a control of moving the own vehicle 100 with power by (i) activating the internal combustion engine 21 of the driving apparatus 20 at the predetermined activation state or a predetermined operation point and (ii) applying the driving force greater than zero to the own vehicle 100 from the driving apparatus 20.

In particular, in the present embodiment, the steady power running control corresponds to a control of (i) activating the driving apparatus 20 at an activation state that a driving energy efficiency (i.e., an energy efficiency of outputting the driving force from the driving apparatus 20) is maintained equal to or greater than a predetermined efficiency and (ii)

applying the driving force greater than zero to the own vehicle 100 from the driving apparatus 20. In particular, the steady power running control corresponds to a control of moving the own vehicle 100 with power by (i) activating the internal combustion engine 21 at an activation state or an operation point that an engine driving energy efficiency (i.e., an energy efficiency of outputting the driving force from the internal combustion engine 21 of the driving apparatus 20) is maintained equal to or greater than a predetermined energy efficiency and (ii) applying the driving force greater than zero to the own vehicle 100 from the driving apparatus 20.

In particular, in the present embodiment, the steady power running control corresponds to an optimum power running control, i.e., a control of moving the own vehicle 100 with power by (i) activating the driving apparatus 20 at an optimum activation state, i.e., an activation state that the driving energy efficiency is maintained at a maximum efficiency or an efficiency around the maximum efficiency and (ii) applying the driving force greater than zero to the own vehicle 100 from the driving apparatus 20. Further, In particular, the steady power running control corresponds to the optimum power running control, i.e., a control of moving the own vehicle 100 with power by (i) activating the internal combustion engine 21 at an activation state or an optimum operation point that the engine driving energy efficiency is maintained at the maximum efficiency or the efficiency around the maximum efficiency and (ii) applying the driving force greater than zero to the own vehicle 100 from the driving apparatus 20.

Therefore, in the present embodiment, when a control of controlling the acceleration and the deceleration of the own vehicle 100 is changed from the optimum power running control to the coasting control in a situation where the second inter-vehicle distance control is being executed, the activation of the internal combustion engine 21 is stopped, and when the control to control the acceleration and the deceleration of the own vehicle 100 is changed from the coasting control to the optimum power running control in the situation where the second inter-vehicle distance control is being executed, the internal combustion engine 21 starts to be activated.

It should be noted that in the present embodiment, the upper limit distance Dupper of the predetermined distance range Rd corresponds to a value greater than the target inter-vehicle distance Dtgt by a predetermined value, and the lower limit distance Dlower of the predetermined distance range Rd corresponds to a value smaller than the target inter-vehicle distance Dtgt by a predetermined value.

Next, the vehicle driving assistance apparatus 10 proceeds with the process to a step S360 to set the value of the second autonomous acceleration/deceleration flag X to "1." Then, the vehicle driving assistance apparatus 10 proceeds with the process to the step S395 to terminate executing this routine once.

On the other hand, when the vehicle driving assistance apparatus 10 determines "No" at the step S345, the vehicle driving assistance apparatus 10 proceeds with the process to a step S355 to execute a second moving speed control.

The second moving speed control corresponds to the autonomous acceleration/deceleration control of autonomously controlling the acceleration and the deceleration of the own vehicle 100 to maintain the own vehicle moving speed Vego within a predetermined speed range Rv by (i) starting to execute the coasting control when the own vehicle moving speed Vego increases and reaches an upper limit value of a predetermined range (i.e., an upper limit speed Vupper of the predetermined speed range Rv) and (ii) starting to execute the steady power running control when the own vehicle moving speed Vego decreases and reaches a lower limit value of the predetermined range (i.e., a lower limit speed Vupper of the predetermined speed range Rv).

In other words, the second moving speed control corresponds to a control of maintaining the own vehicle moving speed Vego at a speed within the predetermined speed range Rv including the set speed Vset by (i) executing the coasting control when the own vehicle moving speed Vego increases and reaches the upper limit value (i.e., the upper limit speed Vupper) of the predetermined speed range Rv and (ii) executing the steady power running control when the own vehicle moving speed Vego decreases and reaches the lower limit value (i.e., the lower limit speed Vlower) of the predetermined speed range Rv.

It should be noted that in the present embodiment, the upper limit speed Vupper of the predetermined speed range Rv corresponds to a value greater than the set speed Vset by a predetermined value, and the lower limit speed Vlower of the predetermined speed range Rv corresponds to a value smaller than the set speed Vset by a predetermined value.

Next, the vehicle driving assistance apparatus 10 proceeds with the process to a step S360 to set the value of the second autonomous acceleration/deceleration flag X to "1." Then, the vehicle driving assistance apparatus 10 proceeds with the process to the step S395 to terminate executing this routine once.

Further, when the vehicle driving assistance apparatus 10 determines "No" at the step S305, the vehicle driving assistance apparatus 10 proceeds with the process directly to the step S395 to terminate executing this routine once.

Next, the routine shown in FIG. 4 will be described.

Figure 3:
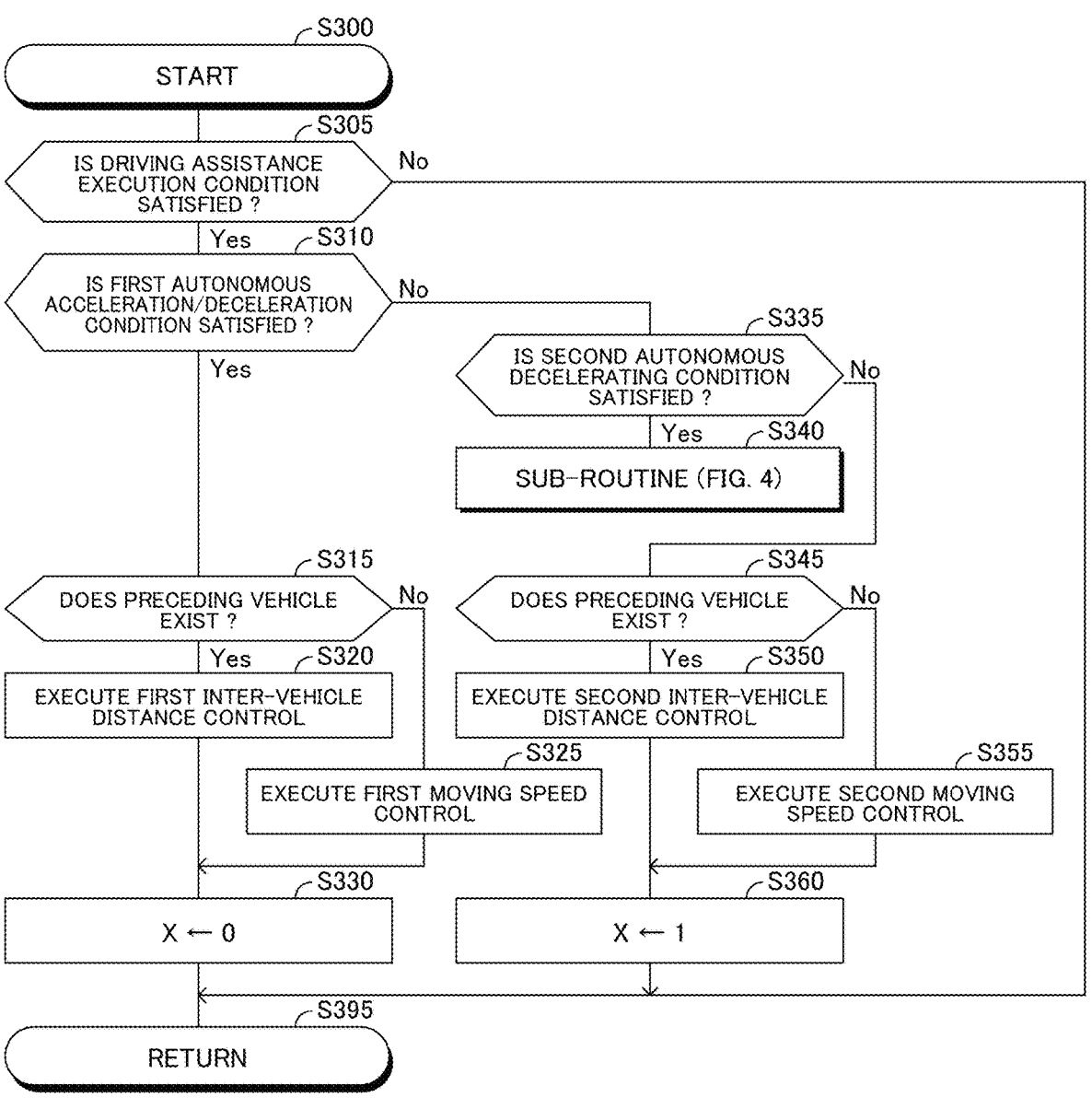
FIG. 3 is a view which shows a flowchart of a routine executed by the vehicle driving assistance apparatus according to the embodiment of the present invention.

The second autonomous decelerating condition Cth which is determined at the step S335 of the routine shown in FIG. 3, corresponds to a condition that the value of the second autonomous acceleration/deceleration flag X is "1", and the optimum power running control is being executed. That is, the second autonomous decelerating condition Cth corresponds to a condition that the deceleration of the own vehicle 100 is not requested in a situation where the second autonomous acceleration/deceleration control is being executed.

When the vehicle driving assistance apparatus 10 determines "Yes" at the step S335 of the routine shown in FIG. 3, the vehicle driving assistance apparatus 10 proceeds with the process to the step S340 and starts to execute the routine shown in FIG. 4 from a step S400, and proceeds with the process to a step S405 to determine whether a low efficiency condition Clow is satisfied.

The low efficiency condition Clow corresponds to a condition that the movement energy efficiency (i.e., the energy efficiency of the driving apparatus 20 to move the own vehicle 100) of moving the own vehicle 100 by executing the second autonomous acceleration/deceleration control (i.e., the second inter-vehicle distance control or the second moving speed control), switching a vehicle moving control (i.e., a control of controlling a movement of the own vehicle 100) between the coasting control and the optimum power running control as described above, is smaller than the movement energy efficiency of moving the own vehicle 100 by executing the first moving speed control in consideration of a road gradient θ (i.e., a gradient of a road on which the own vehicle 100 is moving).

In the present embodiment, the low efficiency condition Clow corresponds to a condition that a low efficiency index value IX is greater than a predetermined value or a low efficiency index value threshold IXth as shown by a formula 1 described below.

$$IX > IXth \qquad (1)$$

The low efficiency index value IX corresponds to an index value which represents a degree that the movement energy efficiency derived from the execution of the second autonomous acceleration/deceleration control (i.e., the energy efficiency of moving the own vehicle 100 by the second autonomous acceleration/deceleration control) decreases with respect to the movement energy efficiency derived from an execution of the first moving speed control (i.e., the energy efficiency of moving the own vehicle 100 by the first moving speed control).

In the present embodiment, the low efficiency index value IX is acquired by a calculation with a formula 2 described below.

$$IX = |Gd| - k * |Ga| \qquad (2)$$

$$Gd = -F/M + g * \sin \theta \qquad (3)$$

$$Ga = (P-F)/M + g * \sin \theta \qquad (4)$$

In the formula 2, "Gd" stands for a coasting acceleration rate, i.e., an acceleration rate of the own vehicle 100 realized while the coasting control is executed. The coasting acceleration rate Gd is acquired by a calculation with a formula 3 described above. The coasting acceleration rate Gd takes a negative value when the own vehicle moving speed Vego is decreasing. On the other hand, when the own vehicle moving speed Vego is increasing, the coasting acceleration rate Gd takes a positive value.

Further, in the formula 2, "Ga" stands for an optimum power running acceleration rate, i.e., the acceleration rate of the own vehicle 100 realized while the optimum power running control is executed. The optimum power running acceleration rate Ga is acquired by a calculation with a formula 4 described above. The optimum power running acceleration rate Ga takes a negative value when the own vehicle moving speed Vego is decreasing. On the other hand, when the own vehicle moving speed Vego is increasing, the optimum power running acceleration rate Ga takes a positive value.

Further, in the formula 3 and the formula 4, "F" stands for a moving resistance of the own vehicle 100. For example, the moving resistance F is acquired by a calculation with a formula 5 described below. Furthermore, "M" stands for a weight of the own vehicle 100, "g" stands for a gravity acceleration rate, and "θ" stands for the road gradient. Furthermore, "P" stands for the driving force applied to the own vehicle 100 from the driving apparatus 20 while the optimum power running control is executed.

$$F = a * Vego^2 + b * Vego + c \qquad (5)$$

In the formula 5, "Vego" stands for the own vehicle moving speed (i.e., the moving speed of the own vehicle 100), and "a", "b", and "c" are coefficients which are determined to acquire the accurate moving resistance of the own vehicle 100 based on the own vehicle moving speed Vego.

Further, the low efficiency index value threshold IXth is set to a predetermined value. Furthermore, in the formula 1 "k" is a coefficient which is set to a predetermined value. The low efficiency index value threshold IXth and the coefficient k are set as described below.

In a situation where the own vehicle 100 is moving on an even road, and the own vehicle 100 is moved by the second autonomous acceleration/deceleration control (i.e., the second inter-vehicle distance control or the second moving speed control) of controlling the movement of the own vehicle 100, switching the control of moving the own vehicle 100 between the coasting control and the optimum power running control, the coasting control is executed when the deceleration of the own vehicle 100 is requested. Therefore, the movement energy efficiency is greater than the movement energy efficiency realized when the own vehicle 100 is moved by the first moving speed control.

However, in a situation where the own vehicle 100 is moved by the second autonomous acceleration/deceleration control, and the own vehicle 100 is moving on an upward slope, the coasting control and the optimum power running control are frequently switched for a certain period of time. Therefore, the movement energy efficiency may be smaller than the movement energy efficiency realized when the own vehicle 100 is moved by the first moving speed control.

Accordingly, in the present embodiment, a combination of the low efficiency index value threshold IXth and the coefficient k are previously acquired by experiments, etc. The acquired combination corresponds to a combination which achieves a situation that the movement energy efficiency of moving the own vehicle 100 by the second autonomous acceleration/deceleration control is equal to the movement energy efficiency of moving the own vehicle 100 by the first moving speed control based on a relationship between the road gradient θ, the coasting acceleration rate Gd, and the optimum power running acceleration rate Ga assuming that the low efficiency index value IX is acquired by the calculation with the formula 2 to the formula 4. Then, the low efficiency index value threshold IXth and the coefficient k of the acquired combination are used in the formula 1 and the formula 2. It should be noted that in the present embodiment, the coefficient k is greater than "0" and equal to or smaller than "1."

Therefore, when the low efficiency index value IX is greater than the low efficiency index value threshold IXth, the movement energy efficiency of moving the own vehicle 100 by the first moving speed control, is greater than the movement energy efficiency of moving the own vehicle 100 by the second autonomous acceleration/deceleration control.

Thus, the vehicle driving assistance apparatus 10 determines whether the movement energy efficiency realized by continuing executing the second autonomous acceleration/deceleration control is greater than the movement energy efficiency realized by terminating executing the second autonomous acceleration/deceleration control and starting to execute the first moving speed control at the step S405.

It should be noted that the low efficiency condition Clow also corresponds to an upward slope gradient condition that the road gradient θ corresponds to an upward slope gradient greater than a predetermined upward slope gradient threshold θup in the situation where the second autonomous acceleration/deceleration control is being executed. In this case, the predetermined upward slope gradient threshold θ is set to the gradient which achieves a situation where an absolute value of the deceleration rate of the own vehicle 100 is equal to or greater than a predetermined value or a predetermined deceleration rate threshold when the road gradient θ corresponds to the upward slope gradient, and the own vehicle 100 is moved by the coasting control. In other words, the predetermined upward slope gradient threshold θ is set to the gradient which achieves a situation where the acceleration rate of the own vehicle 100 is equal to or smaller than a predetermined value or a predetermined acceleration rate threshold when the road gradient θ corresponds to the upward slope gradient, and the own vehicle 100 is moved by the optimum power running control. In other words, the predetermined upward slope gradient threshold θ is set to the gradient which achieves a situation where a rate of an absolute value of the coasting acceleration rate Gd to the optimum power running acceleration rate Ga is greater than a predetermined rate when the road gradient θ corresponds to the upward slope gradient.

Further, a hysteresis may be provided for the low efficiency index value threshold IXth in order to prevent the vehicle moving control from frequently switching between the second autonomous acceleration/deceleration control and the first moving speed control.

Furthermore, when the vehicle moving control is changed from the second autonomous acceleration/deceleration control to the first moving speed control in response to the low efficiency condition Clow becoming satisfied, and then the vehicle driving assistance apparatus 10 determines that the preceding vehicle 200 exists in a situation where the vehicle driving assistance apparatus 10 is executing the first moving speed control, the vehicle moving control is changed from the first moving speed control to the first inter-vehicle distance control.

Furthermore, when the vehicle moving control is changed from the second autonomous acceleration/deceleration control to the first moving speed control in response to the low efficiency condition Clow becoming satisfied, and then the low efficiency condition Clow becomes unsatisfied, the vehicle moving control is changed from the first moving speed control to the second autonomous acceleration/deceleration control. That is, in the present embodiment, when the low efficiency condition Clow becomes satisfied, the execution of the autonomous acceleration/deceleration control is terminated once, and then the second autonomous acceleration/deceleration control starts to be executed in response to the low efficiency condition Clow becoming unsatisfied. In this regard, the vehicle driving assistance apparatus 10 may be configured not to start to execute the second autonomous acceleration/deceleration control even when the execution of the second autonomous acceleration/deceleration control is terminated in response to the low efficiency condition Clow becoming satisfied, and then the low efficiency condition Clow becomes unsatisfied.

Furthermore, as shown in FIG. 1, the own vehicle 100 is installed with a road gradient acquisition device 52. The road gradient acquisition device 52 is a device which acquires the gradient of the road on which the own vehicle 100 is moving. The road gradient acquisition device 52 is, for example, a gyro-sensor or a gyroscope. The road gradient acquisition device 52 is electrically connected to the ECU 90. The vehicle driving assistance apparatus 10 acquires the gradient of the road on which the own vehicle 100 is moving as the road gradient θ by the road gradient acquisition device 52.

When the vehicle driving assistance apparatus 10 determines "Yes" at the step S405, the vehicle driving assistance apparatus 10 proceeds with the process to a step S410 to execute the first moving speed control. Then, the vehicle driving assistance apparatus 10 proceeds with the process to a step S495 to terminate executing this routine once.

Figure 5:
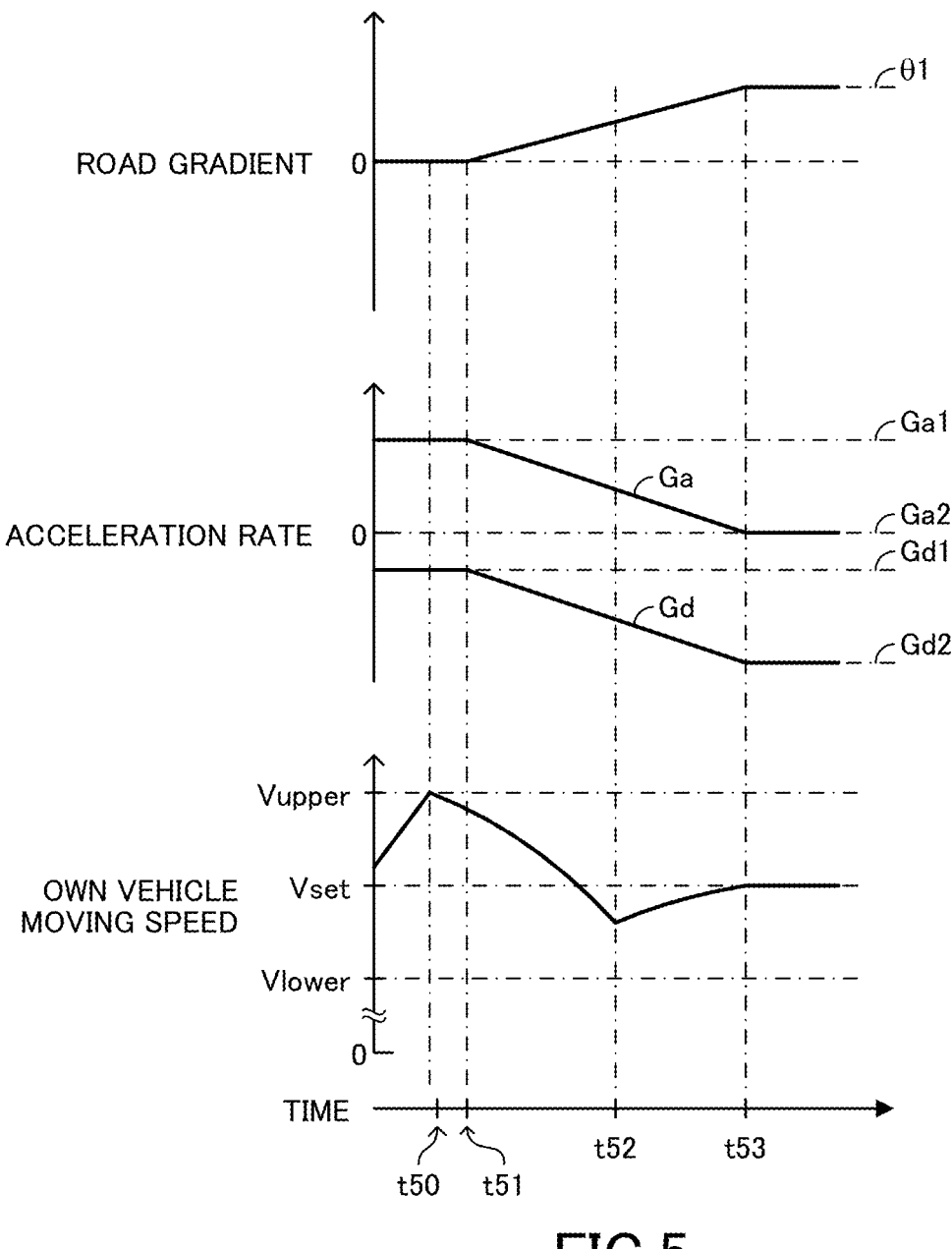
FIG. 5 is a view which shows a time chart showing changes of a road gradient and an own vehicle moving speed when an execution of a second autonomous acceleration/deceleration control is terminated, and a first moving speed control starts to be executed.

Thereby, the own vehicle moving speed Vego is controlled as shown in FIG. 5. In an example shown in FIG. 5, before a point of time t50, the own vehicle 100 is moving on the road in which the road gradient θ is zero, i.e., the own vehicle 100 is moving on the even road, and the optimum power running control is executed. Thus, the own vehicle moving speed Vego gradually increases until the point of time t50. It should be noted that the optimum power running acceleration rate Ga and the coasting acceleration rate Gd at the moment correspond to a first optimum power running acceleration rate Ga1 and a first coasting acceleration rate Gd1, respectively. Further, the first optimum power running acceleration rate Ga1 takes a positive value, and the first coasting acceleration rate Gd1 takes a negative value.

Then, when the own vehicle moving speed Vego reaches the upper limit speed Vupper at the point of time t50, the coasting control starts to be executed. At this moment, the own vehicle 100 is moving on the road in which the road gradient θ is zero. Therefore, the own vehicle 100 is moving on the even road. Thus, the own vehicle moving speed Vego starts to decrease. It should be noted that the optimum power running acceleration rate Ga and the coasting acceleration rate Gd at the moment also correspond to the first optimum power running acceleration rate Ga1 and the first coasting acceleration rate Gd1, respectively.

Then, at a point of time t51, the own vehicle 100 starts to move on the upward slope. In the example shown in FIG. 5, the road gradient θ continues to increase from the point of time t51 to a point of time t53, and keeps a constant value θ1 after the point of time t53. Therefore, the optimum power running acceleration rate Ga and the coasting acceleration rate Gd gradually decrease from the point of time t51 to the point of time t53. In other words, the absolute value of the optimum power running acceleration rate Ga gradually decreases, and the absolute value of the coasting acceleration rate Gd gradually increases. After the point of time t53, the optimum power running acceleration rate Ga and the coasting acceleration rate Gd keep a second optimum power running acceleration rate Ga2 and a second coasting acceleration rate Gd2, respectively.

After the point of time t51, the own vehicle moving speed Vego continues decreasing. In the example shown in FIG. 5, at a point of time t52, the low efficiency condition Clow becomes satisfied. Therefore, the execution of the second autonomous acceleration/deceleration control is terminated, and the first moving speed control starts to be executed. At the moment, the own vehicle moving speed Vego is smaller than the set speed Vset. Thus, the own vehicle 100 is accelerated, and the own vehicle moving speed Vego increases. After the own vehicle moving speed Vego reaches the set speed Vset, the acceleration rate of the own vehicle 100 is controlled to maintain the own vehicle moving speed Vego at the set speed Vset.

Thereby, when the low efficiency condition Clow becomes satisfied in the situation where the second autonomous acceleration/deceleration control is being executed, the examination of the second autonomous acceleration/deceleration control is terminated, and the first moving speed control is executed. Therefore, the movement energy efficiency can be prevented from decreasing due to a fact that the second autonomous acceleration/deceleration control continues being executed.

On the other hand, when the vehicle driving assistance apparatus 10 determines "No" at the step S405, the vehicle driving assistance apparatus 10 proceeds with the process to a step S415 to determine whether a coasting acceleration rate condition Cd is satisfied.

The coasting acceleration rate condition Cd corresponds to a condition that the own vehicle 100 is moving on a downward slope having the small gradient.

In the present embodiment, the coasting acceleration rate condition Cd corresponds to a condition that the coasting acceleration rate Gd is greater than zero as shown by a formula 6 described below, and the absolute value of the coasting acceleration rate Gd is equal to or greater than a predetermined acceleration rate Gth as shown by a formula 7 described below.

$$Gd > 0 \tag{6}$$

$$|Gd| \geq Gth \tag{7}$$

The predetermined acceleration rate Gth corresponds to a threshold used for determining whether the own vehicle 100 is moving on the downward slope having the small gradient. In the present embodiment, the predetermined acceleration rate Gth is set to a positive value near zero.

Therefore, the coasting acceleration rate condition Cd corresponds to a downward slope gradient condition that the road gradient θ corresponds to a downward slope gradient greater than a predetermined value or a predetermined downward slope gradient threshold θdown.

When the vehicle driving assistance apparatus 10 determines "Yes" at the step S415, the vehicle driving assistance apparatus 10 proceeds with the process to a step S420 to determine whether a moving speed condition Cv is satisfied.

The moving speed condition Cv corresponds to a condition that the own vehicle moving speed Vego is smaller than the set speed Vset as shown by a formula 8 described below.

$$Vego < Vset \tag{8}$$

When the vehicle driving assistance apparatus 10 determines "Yes" at the step S420, the vehicle driving assistance apparatus 10 proceeds with the process to a step S425 to execute the coasting control. Then, the vehicle driving assistance apparatus 10 proceeds with the process to the step S495 to terminate executing this routine once.

That is, even when the own vehicle 100 coasts in a situation where the own vehicle moving speed Vego is smaller than the set speed Vset, and the own vehicle 100 is moving on the downward slope having the small gradient, the own vehicle moving speed Vego increases. Therefore, in this situation, the vehicle driving assistance apparatus 10 executes the coasting control.

On the other hand, when the vehicle driving assistance apparatus 10 determines "No" at the step S420, the vehicle driving assistance apparatus 10 proceeds with the process to a step S430 to execute the first moving speed control. Then, the vehicle driving assistance apparatus 10 proceeds with the process to the step S495 to terminate executing this routine once.

That is, when the coasting acceleration rate condition Cd (i.e., the downward slope gradient condition) becomes satisfied, and the own vehicle moving speed Vego is smaller than the set speed Vset (i.e., a predetermined moving speed), the execution of the autonomous acceleration/deceleration control is terminated, and the coasting control is executed.

Further, when the vehicle driving assistance apparatus 10 determines "Yes" at the step S420, and the coasting control starts to be executed at the step S425, and then the own vehicle moving speed Vego reaches the set speed Vset, the vehicle moving control is changed from the coasting control to the first moving speed control.

Figure 6:
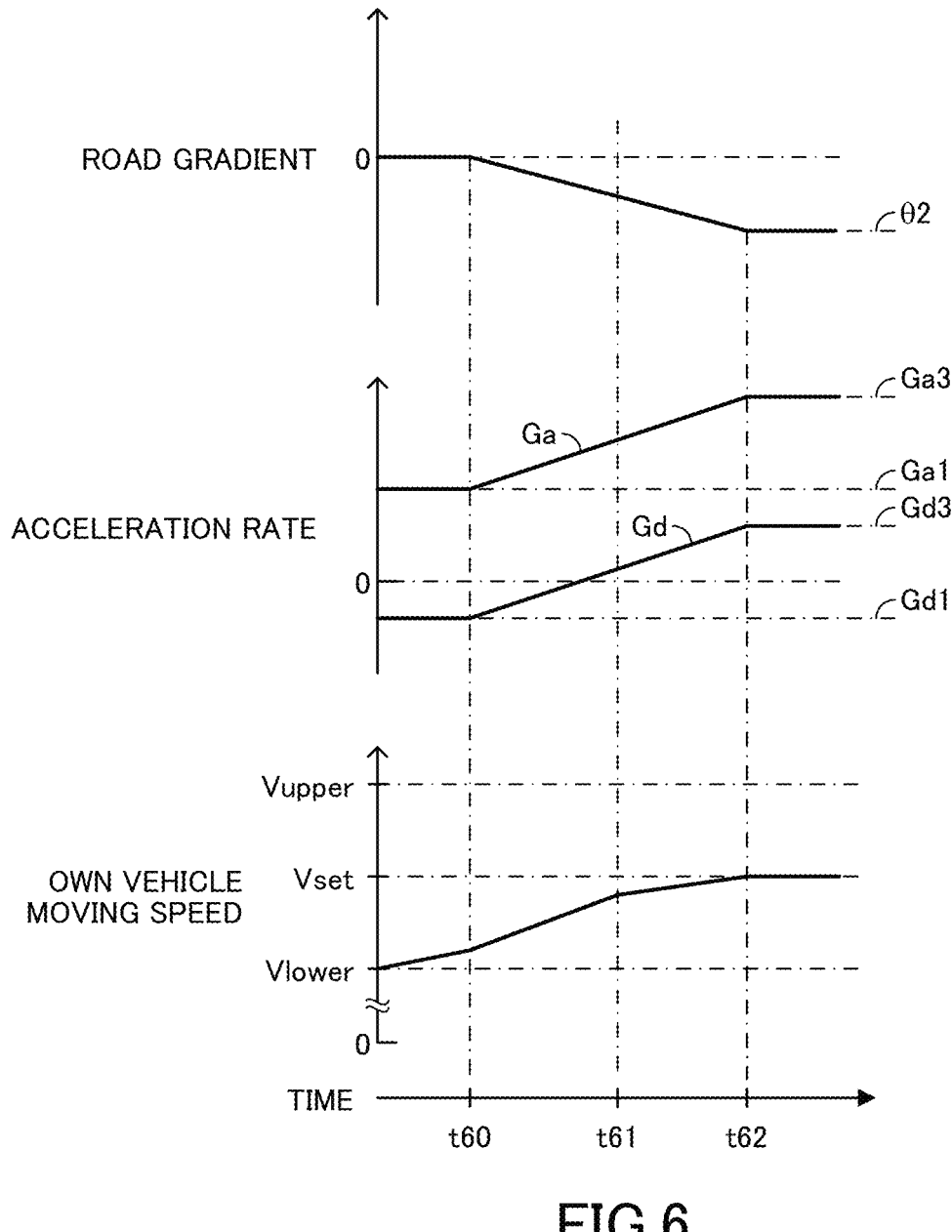
FIG. 6 is a view which shows a time chart showing changes of the road gradient and the own vehicle moving speed when the execution of the second autonomous acceleration/deceleration control is terminated, and a coasting control is executed, and then the first moving speed control is executed.

Thereby, the own vehicle moving speed Vego is controlled as shown in FIG. 6. In an example shown in FIG. 6, before a point of time t60, the own vehicle 100 is moving on the road in which the road gradient θ is zero, i.e., the own vehicle 100 is moving on the even road, and the optimum power running control is being executed. Thus, the own vehicle moving speed Vego gradually increases until the point of time t60. It should be noted that the optimum power running acceleration rate Ga and the coasting acceleration rate Gd at the moment correspond to the first optimum power running acceleration rate Ga1 and the first coasting acceleration rate Gd1, respectively. Further, the first optimum power running acceleration rate Ga1 takes a positive value, and the first coasting acceleration rate Gd1 takes a negative value.

Then, at the point of time t60, the own vehicle 100 starts to move on the downward slope. In the example shown in FIG. 6, the road gradient θ continues to decrease from the point of time t60 to a point of time t62, and keeps a constant value θ2 after the point of time t62. Therefore, the optimum power running acceleration rate Ga and the coasting acceleration rate Gd gradually increase from the point of time t60 to the point of time t62. In other words, the absolute value of the optimum power running acceleration rate Ga gradually increases. On the other hand, the coasting acceleration rate Gd takes a negative value until the point of time t61. Therefore, the absolute value of the coasting acceleration rate Gd gradually decreases. After the point of time t61, the coasting acceleration rate Gd takes a positive value. Therefore, the absolute value of the coasting acceleration rate Gd gradually increases. After the point of time t62, the optimum power running acceleration rate Ga and the coasting acceleration rate Gd keep a third optimum power running acceleration rate Ga3 and a third coasting acceleration rate Gd3, respectively.

In the example shown in FIG. 6, the optimum power running control continues being executed, and the own vehicle 100 is moving on the downward slope from the point of time t60 to a point of time t61. Therefore, the own vehicle moving speed Vego continues increasing at a relatively great increasing rate. Then, at the point of time t61, the coasting acceleration rate condition Cd becomes satisfied. At the moment, the own vehicle moving speed Vego is smaller than the set speed Vset. Therefore, the execution of the second autonomous acceleration/deceleration control is terminated, and the coasting control starts to be executed. Thereby, an increasing rate of the own vehicle moving speed Vego becomes small, but the own vehicle moving speed Vego continues increasing.

Then, at the point of time t62, the own vehicle moving speed Vego reaches the set speed Vset. Therefore, an execution of the coasting control is terminated, and the first moving speed control starts to be executed. Thereby, after the own vehicle moving speed Vego reaches the set speed Vset, the acceleration and the deceleration of the own vehicle 100 are controlled to maintain the own vehicle moving speed Vego at the set speed Vset.

For example, when the own vehicle 100 coasts in a situation where the own vehicle 100 is moving on the downward slope, the own vehicle 100 is not decelerated, and is accelerated. Thus, the own vehicle moving speed Vego increases excessively. As a result, the own vehicle moving speed Vego cannot be maintained within the predetermined speed range Rv, or the inter-vehicle distance D cannot be maintained within the predetermined distance range Rd even when the second autonomous acceleration/deceleration control is executed. In such a situation, the second autonomous acceleration/deceleration control should not continue being executed.

With the vehicle driving assistance apparatus 10, when the coasting acceleration rate condition Cd becomes satisfied, the execution of the second autonomous acceleration/deceleration control is terminated. Thus, the second autonomous acceleration/deceleration control can be prevented from continuing being executed in a situation where the second autonomous acceleration/deceleration control should not be executed.

Further, when the vehicle driving assistance apparatus 10 determines "No" at the step S415, the vehicle driving assistance apparatus 10 proceeds with the process to the step S345 of the routine shown in FIG. 3 via a step S435 to execute processes described above. Then, the vehicle driving assistance apparatus 10 terminates executing this routine once.

That is, when the coasting acceleration rate condition Cd (i.e., the downward slope gradient condition) becomes satisfied in a situation where the own vehicle moving speed Vego is equal to or greater than the set speed Vset (i.e., the predetermined moving speed), the execution of the second autonomous acceleration/deceleration control is terminated, and the first moving speed control is executed.

The operations of the vehicle driving assistance apparatus 10 have been described.

It should be noted that the invention is not limited to the aforementioned embodiments, and various modifications can be employed within the scope of the invention.

For example, the low efficiency condition Clow may correspond to a condition that the absolute value of the coasting acceleration rate Gd is greater than a predetermined value, or a condition that the absolute value of the optimum power running acceleration rate Ga is smaller than a predetermined value.

Figure 7:
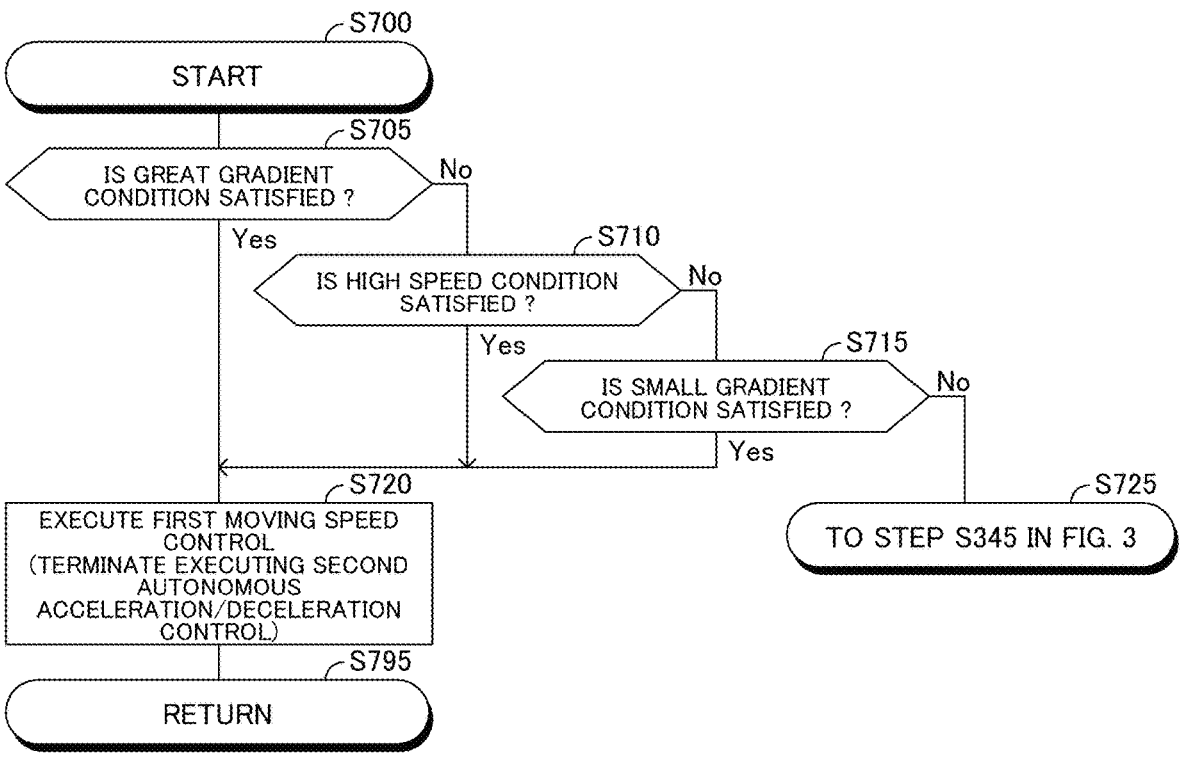
FIG. 7 is a view which shows a flowchart of a routine executed by the vehicle driving assistance apparatus according to the embodiment of the present invention.

Further, the vehicle driving assistance apparatus 10 may be configured to execute a routine shown in FIG. 7 in place of the routine shown in FIG. 4. In this case, when the vehicle driving assistance apparatus 10 determines "Yes" at the step S335 of the routine shown in FIG. 3, the vehicle driving assistance apparatus 10 proceeds with the process to the step S340 to execute the routine shown in FIG. 7.

When the vehicle driving assistance apparatus 10 proceeds with the process to the step S340, the vehicle driving assistance apparatus 10 starts to execute the routine shown in FIG. 7 from a step S700 and proceeds with the process to a step S705 to determine whether a great gradient condition Cgh corresponding to a first condition is satisfied.

The great gradient condition Cgh corresponding to a first condition is more likely to becomes satisfied when the road gradient θ is relatively great than when the road gradient θ is relatively small. In particular, the great gradient condition Cgh corresponds to a condition that the road gradient θ (i.e., the gradient of the road on which the own vehicle 100 is moving) corresponds to the upward slope gradient greater than a predetermined upward slope gradient threshold θup.

When the vehicle driving assistance apparatus 10 determines "Yes" at the step S705, the vehicle driving assistance apparatus 10 proceeds with the process to a step S720 to terminate executing the second autonomous acceleration/deceleration control and execute the first moving speed control. Next, the vehicle driving assistance apparatus 10 proceeds with the process to a step S795 to terminate executing this routine once.

On the other hand, when the vehicle driving assistance apparatus 10 determines "No" at the step S705, the vehicle driving assistance apparatus 10 proceeds with the process to a step S710 to determine whether a high speed condition Cvh corresponding to the first condition is satisfied.

The high speed condition Cvh corresponding to the first condition is more likely to become satisfied when the own vehicle moving speed Vego (i.e., the moving speed of the own vehicle 100) is relatively great than when the own vehicle moving speed Vego is relatively small. In particular, the high speed condition Cvh corresponds to a condition that the own vehicle moving speed Vego is greater than a predetermined value or a predetermined vehicle moving speed threshold Vth.

That is, when the own vehicle moving speed Vego is great, the moving resistance of the own vehicle 100 is great. Therefore, if the second autonomous acceleration/deceleration control continues being executed, the movement energy efficiency decreases. Thus, the vehicle driving assistance apparatus 10 determines whether the own vehicle moving speed Vego is greater than the predetermined vehicle moving speed Vth at the step S710.

When the vehicle driving assistance apparatus 10 determines "Yes" at the step S710, the vehicle driving assistance apparatus 10 proceeds with the process to a step S720 to terminate executing the second autonomous acceleration/deceleration control and execute the first moving speed control. Next, the vehicle driving assistance apparatus 10 proceeds with the process to the step S795 to terminate executing this routine once.

On the other hand, when the vehicle driving assistance apparatus 10 determines "No" at the step S710, the vehicle driving assistance apparatus 10 proceeds with the process to a step S715 to determine whether a small gradient condition Cgl corresponding to a second condition is satisfied.

The small gradient condition Cgl corresponding to the second condition is more likely to become satisfied when the road gradient θ (i.e., the gradient of the road on which the own vehicle 100 is moving) is relatively small than when the road gradient θ is relatively great. In particular, the small gradient condition Cgl corresponds to a condition that the road gradient θ corresponds to the downward slope gradient greater than a predetermined downward slope gradient threshold θdown.

When the vehicle driving assistance apparatus 10 determines "Yes" at the step S715, the vehicle driving assistance apparatus 10 proceeds with the process to a step S720 to terminate executing the second autonomous acceleration/deceleration control and execute the first moving speed control. Next, the vehicle driving assistance apparatus 10 proceeds with the process to the step S795 to terminate executing this routine once.

On the other hand, when the vehicle driving assistance apparatus 10 determines "No" at the step S715, the vehicle driving assistance apparatus 10 proceeds with the process to the step S345 of the routine shown in FIG. 3 via a step S725 to execute the processes described above. Then, the vehicle driving assistance apparatus 10 terminates executing this routine once.

It should be noted that the predetermined upward slope gradient threshold θup used at the step S705 of the routine shown in FIG. 7, may be set to a value depending on the own vehicle moving speed Vego. In particular, the predetermined upward slope gradient threshold θup may be set to a value which decreases as the own vehicle moving speed Vego increases. Further, in this case, for example, the predetermined upward slope gradient threshold θup may be set to zero when the own vehicle moving speed Vego corresponds to a predetermined speed, and may be maintained zero when the own vehicle moving speed Vego is greater than the predetermined speed.

As described above, the vehicle driving assistance apparatus 10 is configured to terminate executing the second autonomous acceleration/deceleration control when a predetermined condition (i.e., the great gradient condition Cgh, or the high speed condition Cvh, or the small gradient condition Cgl) relating to at least one of the road gradient θ

(i.e., the gradient of the road on which the own vehicle 100 is moving) and the own vehicle moving speed Vego (i.e., the moving speed of the own vehicle 100), becomes satisfied.

Thereby, the movement energy efficiency of the own vehicle 100 can be maintained at a high efficiency.

What is claimed is:

1. A vehicle driving assistance apparatus, comprising an electronic control unit configured to:

execute an autonomous acceleration/deceleration control of autonomously controlling an acceleration and a deceleration of an own vehicle so as to maintain a moving speed of the own vehicle within a predetermined speed range, or maintain a distance between the own vehicle and another vehicle existing around the own vehicle within a predetermined distance range;

execute a coasting control of causing the own vehicle to coast when the deceleration of the own vehicle is requested in a situation where the electronic control unit is executing the autonomous acceleration/deceleration control; and execute a power running control of running the own vehicle with power when the acceleration of the own vehicle is requested in the situation where the electronic control unit is executing the autonomous acceleration/deceleration control, wherein the electronic control unit is configured to terminate executing the autonomous acceleration/deceleration control when a predetermined condition relating to at least one of (i) a gradient of a road on which the own vehicle is moving and (ii) the moving speed of the own vehicle becomes satisfied in the situation where the electronic control unit is executing the autonomous acceleration/deceleration control, wherein the predetermined condition includes one of a first condition and a second condition, wherein the first condition corresponds to one of:

a high speed condition that the moving speed of the own vehicle is greater than a predetermined vehicle speed threshold; and an upward slope gradient condition that the gradient of the road on which the own vehicle is moving corresponds to an upward slope gradient which is greater than a predetermined upward slope gradient threshold, wherein the second condition corresponds to a downward slope gradient condition that the gradient of the road on which the own vehicle is moving corresponds to a downward slope gradient which is greater than a predetermined downward slope gradient threshold, and wherein the electronic control unit is further configured to start to execute a moving speed control of autonomously accelerating or decelerating the own vehicle to maintain the moving speed of the own vehicle at a predetermined moving speed when the first condition becomes satisfied, and the electronic control unit terminates executing the autonomous acceleration/deceleration control.

2. The vehicle driving assistance apparatus as claimed in claim 1, wherein the predetermined condition includes one of a first condition and a second condition, wherein a probability of the first condition becoming satisfied is greater when the moving speed of the own vehicle is equal to or greater than a predetermined first speed than when the moving speed of the own vehicle is smaller than the predetermined first speed, or a probability of the first condition becoming satisfied is greater when the gradient of the road on which the own vehicle is moving is equal to or greater than a predetermined first gradient than when the gradient of the road on which the own vehicle is moving is smaller than the predetermined first gradient, and wherein a probability of the second condition becoming satisfied is greater when the gradient of the road on which the own vehicle is moving is equal to or smaller than a predetermined second gradient than when the gradient of the road on which the own vehicle is moving is greater than the predetermined second gradient.

3. The vehicle driving assistance apparatus as claimed in claim 1, wherein the electronic control unit is configured to execute the coasting control when the second condition becomes satisfied, and the electronic control unit terminates executing the autonomous acceleration/deceleration control in a situation where the moving speed of the own vehicle is smaller than the predetermined moving speed.

4. The vehicle driving assistance apparatus as claimed in claim 1, wherein the power running control corresponds to an optimum power running control of (i) activating a driving apparatus at an activation state where an energy efficiency of moving the own vehicle is equal to or greater than a predetermined energy efficiency and (ii) moving the own vehicle by a driving force output from the driving apparatus, and wherein the predetermined upward slope gradient threshold is set to one of:

a gradient at which an absolute value of a deceleration rate of the own vehicle is equal to or greater than a predetermined deceleration rate threshold in a situation where the gradient of the road on which the own vehicle is moving corresponds to the upward slope gradient, and the own vehicle is moved by the coasting control; and a gradient at which an acceleration rate of the own vehicle is equal to or smaller than a predetermined acceleration rate threshold in a situation where the gradient of the road on which the own vehicle is moving corresponds to the upward slope gradient, and the own vehicle is moved by the optimum power running control.

5. The vehicle driving assistance apparatus as claimed in claim 1, wherein the power running control corresponds to an optimum power running control of (i) activating a driving apparatus at an activation state where an energy efficiency of moving the own vehicle is equal to or greater than a predetermined energy efficiency and (ii) moving the own vehicle by a driving force output from the driving apparatus, and wherein the predetermined upward slope threshold is set to a gradient at which a rate of an absolute value of an upward-slope-gradient coasting deceleration rate of the own vehicle to an upward-slope-gradient optimum acceleration rate of the own vehicle is greater than a predetermined rate, wherein the upward-slope-gradient optimum acceleration rate corresponds to an acceleration rate of the own vehicle realized by moving the own vehicle by the optimum power running control in the situation where the gradient of the road on which the own vehicle is moving corresponds to the upward slope gradient, and wherein the upward-slope-gradient coasting deceleration rate corresponds to a deceleration rate of the own vehicle realized by moving the own vehicle by the coasting control in the situation where the gradient of the road on which the own vehicle is moving corresponds to the upward slope gradient.

6. A vehicle driving assistance method, comprising steps of:

executing an autonomous acceleration/deceleration control of autonomously controlling an acceleration and a deceleration of an own vehicle so as to maintain a moving speed of the own vehicle within a predetermined speed range, or maintain a distance between the own vehicle and another vehicle existing around the own vehicle within a predetermined distance range;

executing a coasting control of causing the own vehicle to coast when the deceleration of the own vehicle is requested in a situation where the electronic control unit is executing the autonomous acceleration/deceleration control; and executing a power running control of running the own vehicle with power when the acceleration of the own vehicle is requested in the situation where the electronic control unit is executing the autonomous acceleration/deceleration control, wherein the vehicle driving assistance method comprises a step of terminating executing the autonomous acceleration/deceleration control when a predetermined condition relating to at least one of (i) a gradient of a road on which the own vehicle is moving and (ii) the moving speed of the own vehicle becomes satisfied in the situation where the electronic control unit is executing the autonomous acceleration/deceleration control, wherein the predetermined condition includes one of a first condition and a second condition, wherein the first condition corresponds to one of:

a high speed condition that the moving speed of the own vehicle is greater than a predetermined vehicle speed threshold; and an upward slope gradient condition that the gradient of the road on which the own vehicle is moving corresponds to an upward slope gradient which is greater than a predetermined upward slope gradient threshold, wherein the second condition corresponds to a downward slope gradient condition that the gradient of the road on which the own vehicle is moving corresponds to a downward slope gradient which is greater than a predetermined downward slope gradient threshold, and wherein the vehicle driving assistance method further comprises starting to execute a moving speed control of autonomously accelerating or decelerating the own vehicle to maintain the moving speed of the own vehicle at a predetermined moving speed when the first condition becomes satisfied, and terminating executing the autonomous acceleration/deceleration control.

7. A computer-readable storage medium storing a vehicle driving assistance program which is configured to:

execute an autonomous acceleration/deceleration control of autonomously controlling an acceleration and a deceleration of an own vehicle so as to maintain a moving speed of the own vehicle within a predetermined speed range, or maintain a distance between the own vehicle and another vehicle existing around the own vehicle within a predetermined distance range;

execute a coasting control of causing the own vehicle to coast when the deceleration of the own vehicle is requested in a situation where the electronic control unit is executing the autonomous acceleration/deceleration control; and execute a power running control of running the own vehicle with power when the acceleration of the own vehicle is requested in the situation where the electronic control unit is executing the autonomous acceleration/deceleration control, wherein the vehicle driving assistance program is configured to terminate executing the autonomous acceleration/deceleration control when a predetermined condition relating to at least one of (i) a gradient of a road on which the own vehicle is moving and (ii) the moving speed of the own vehicle becomes satisfied in the situation where the electronic control unit is executing the autonomous acceleration/deceleration control, wherein the predetermined condition includes one of a first condition and a second condition, wherein the first condition corresponds to one of:

a high speed condition that the moving speed of the own vehicle is greater than a predetermined vehicle speed threshold; and an upward slope gradient condition that the gradient of the road on which the own vehicle is moving corresponds to an upward slope gradient which is greater than a predetermined upward slope gradient threshold, wherein the second condition corresponds to a downward slope gradient condition that the gradient of the road on which the own vehicle is moving corresponds to a downward slope gradient which is greater than a predetermined downward slope gradient threshold, and wherein the vehicle driving assistance program is further configured to start to execute a moving speed control of autonomously accelerating or decelerating the own vehicle to maintain the moving speed of the own vehicle at a predetermined moving speed when the first condition becomes satisfied, and terminating executing the autonomous acceleration/deceleration control.

8. A vehicle driving assistance apparatus, comprising an electronic control unit configured to:

execute an autonomous acceleration/deceleration control of autonomously controlling an acceleration and a deceleration of an own vehicle so as to maintain a moving speed of the own vehicle within a predetermined speed range, or maintain a distance between the own vehicle and another vehicle existing around the own vehicle within a predetermined distance range;

execute a coasting control of causing the own vehicle to coast when the deceleration of the own vehicle is requested in a situation where the electronic control unit is executing the autonomous acceleration/deceleration control; and execute a power running control of running the own vehicle with power when the acceleration of the own vehicle is requested in the situation where the electronic control unit is executing the autonomous acceleration/deceleration control, wherein the electronic control unit is configured to terminate executing the autonomous acceleration/deceleration control when a predetermined condition relating to at least one of (i) a gradient of a road on which the own vehicle is moving and (ii) the moving speed of the own vehicle becomes satisfied in the situation where the electronic control unit is executing the autonomous acceleration/deceleration control,

wherein the predetermined condition includes one of a first condition and a second condition, wherein the first condition corresponds to one of:

a high speed condition that the moving speed of the own vehicle is greater than a predetermined vehicle speed threshold; and an upward slope gradient condition that the gradient of the road on which the own vehicle is moving corresponds to an upward slope gradient which is greater than a predetermined upward slope gradient threshold, wherein the second condition corresponds to a downward slope gradient condition that the gradient of the road on which the own vehicle is moving corresponds to a downward slope gradient which is greater than a predetermined downward slope gradient threshold, and wherein the electronic control unit is configured to execute a moving speed control of autonomously accelerating or decelerating the own vehicle to maintain the moving speed of the own vehicle at a predetermined moving speed when the second condition becomes satisfied, and the electronic control unit terminates executing the autonomous acceleration/deceleration control in a situation where the moving speed of the own vehicle is equal to or greater than a predetermined moving speed.

9. The vehicle driving assistance apparatus as claimed in claim 8, wherein the predetermined condition includes one of a first condition and a second condition, wherein a probability of the first condition becoming satisfied is greater when the moving speed of the own vehicle is equal to or greater than a predetermined first speed than when the moving speed of the own vehicle is smaller than the predetermined first speed, or a probability of the first condition becoming satisfied is greater when the gradient of the road on which the own vehicle is moving is equal to or greater than a predetermined first gradient than when the gradient of the road on which the own vehicle is moving is smaller than the predetermined first gradient, and wherein a probability of the second condition becoming satisfied is greater when the gradient of the road on which the own vehicle is moving is equal to or smaller than a predetermined second gradient than when the gradient of the road on which the own vehicle is moving is greater than the predetermined second gradient.

10. The vehicle driving assistance apparatus as claimed in claim 8, wherein the electronic control unit is configured to execute the coasting control when the second condition becomes satisfied, and the electronic control unit terminates executing the autonomous acceleration/deceleration control in a situation where the moving speed of the own vehicle is smaller than the predetermined moving speed.

11. The vehicle driving assistance apparatus as claimed in claim 8, wherein the power running control corresponds to an optimum power running control of (i) activating a driving apparatus at an activation state where an energy efficiency of moving the own vehicle is equal to or greater than a predetermined energy efficiency and (ii) moving the own vehicle by a driving force output from the driving apparatus, and wherein the predetermined upward slope gradient threshold is set to one of:

a gradient at which an absolute value of a deceleration rate of the own vehicle is equal to or greater than a predetermined deceleration rate threshold in a situation where the gradient of the road on which the own vehicle is moving corresponds to the upward slope gradient, and the own vehicle is moved by the coasting control; and a gradient at which an acceleration rate of the own vehicle is equal to or smaller than a predetermined acceleration rate threshold in a situation where the gradient of the road on which the own vehicle is moving corresponds to the upward slope gradient, and the own vehicle is moved by the optimum power running control.

12. The vehicle driving assistance apparatus as claimed in claim 8, wherein the power running control corresponds to an optimum power running control of (i) activating a driving apparatus at an activation state where an energy efficiency of moving the own vehicle is equal to or greater than a predetermined energy efficiency and (ii) moving the own vehicle by a driving force output from the driving apparatus, and wherein the predetermined upward slope threshold is set to a gradient at which a rate of an absolute value of an upward-slope-gradient coasting deceleration rate of the own vehicle to an upward-slope-gradient optimum acceleration rate of the own vehicle is greater than a predetermined rate, wherein the upward-slope-gradient optimum acceleration rate corresponds to an acceleration rate of the own vehicle realized by moving the own vehicle by the optimum power running control in the situation where the gradient of the road on which the own vehicle is moving corresponds to the upward slope gradient, and wherein the upward-slope-gradient coasting deceleration rate corresponds to a deceleration rate of the own vehicle realized by moving the own vehicle by the coasting control in the situation where the gradient of the road on which the own vehicle is moving corresponds to the upward slope gradient.

13. A vehicle driving assistance method, comprising steps of:

executing an autonomous acceleration/deceleration control of autonomously controlling an acceleration and a deceleration of an own vehicle so as to maintain a moving speed of the own vehicle within a predetermined speed range, or maintain a distance between the own vehicle and another vehicle existing around the own vehicle within a predetermined distance range;

executing a coasting control of causing the own vehicle to coast when the deceleration of the own vehicle is requested in a situation where the electronic control unit is executing the autonomous acceleration/deceleration control; and executing a power running control of running the own vehicle with power when the acceleration of the own vehicle is requested in the situation where the electronic control unit is executing the autonomous acceleration/deceleration control, wherein the vehicle driving assistance method comprises a step of terminating executing the autonomous acceleration/deceleration control when a predetermined condition relating to at least one of (i) a gradient of a road on which the own vehicle is moving and (ii) the moving speed of the own vehicle becomes satisfied in the situation where the electronic control unit is executing the autonomous acceleration/deceleration control, wherein the predetermined condition includes one of a first condition and a second condition, wherein the first condition corresponds to one of:

a high speed condition that the moving speed of the own vehicle is greater than a predetermined vehicle speed threshold; and an upward slope gradient condition that the gradient of the road on which the own vehicle is moving corresponds to an upward slope gradient which is greater than a predetermined upward slope gradient threshold, wherein the second condition corresponds to a downward slope gradient condition that the gradient of the road on which the own vehicle is moving corresponds to a downward slope gradient which is greater than a predetermined downward slope gradient threshold, and wherein the vehicle driving assistance method further comprises executing a moving speed control of autonomously accelerating or decelerating the own vehicle to maintain the moving speed of the own vehicle at a predetermined moving speed when the second condition becomes satisfied, and terminating executing the autonomous acceleration/deceleration control in a situation where the moving speed of the own vehicle is equal to or greater than a predetermined moving speed.

14. A computer-readable storage medium storing a vehicle driving assistance program which is configured to:

execute an autonomous acceleration/deceleration control of autonomously controlling an acceleration and a deceleration of an own vehicle so as to maintain a moving speed of the own vehicle within a predetermined speed range, or maintain a distance between the own vehicle and another vehicle existing around the own vehicle within a predetermined distance range;

execute a coasting control of causing the own vehicle to coast when the deceleration of the own vehicle is requested in a situation where the electronic control unit is executing the autonomous acceleration/deceleration control; and execute a power running control of running the own vehicle with power when the acceleration of the own vehicle is requested in the situation where the electronic control unit is executing the autonomous acceleration/deceleration control, wherein the vehicle driving assistance program is configured to terminate executing the autonomous acceleration/deceleration control when a predetermined condition relating to at least one of (i) a gradient of a road on which the own vehicle is moving and (ii) the moving speed of the own vehicle becomes satisfied in the situation where the electronic control unit is executing the autonomous acceleration/deceleration control, wherein the predetermined condition includes one of a first condition and a second condition, wherein the first condition corresponds to one of:

a high speed condition that the moving speed of the own vehicle is greater than a predetermined vehicle speed threshold; and an upward slope gradient condition that the gradient of the road on which the own vehicle is moving corresponds to an upward slope gradient which is greater than a predetermined upward slope gradient threshold, wherein the second condition corresponds to a downward slope gradient condition that the gradient of the road on which the own vehicle is moving corresponds to a downward slope gradient which is greater than a predetermined downward slope gradient threshold, and wherein the vehicle driving assistance program is further configured to execute a moving speed control of autonomously accelerating or decelerating the own vehicle to maintain the moving speed of the own vehicle at a predetermined moving speed when the second condition becomes satisfied, and terminating executing the autonomous acceleration/deceleration control in a situation where the moving speed of the own vehicle is equal to or greater than a predetermined moving speed.

* * * * *